United States Patent
Gates

(10) Patent No.: US 6,449,709 B1
(45) Date of Patent: Sep. 10, 2002

(54) FAST STACK SAVE AND RESTORE SYSTEM AND METHOD

(75) Inventor: Stillman F. Gates, Los Gatos, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/321,329

(22) Filed: May 27, 1999

Related U.S. Application Data

(60) Provisional application No. 60/087,701, filed on Jun. 2, 1998.

(51) Int. Cl.$^7$ .............................. G06F 9/312; G06F 9/32; G06F 12/08; G06F 13/16
(52) U.S. Cl. ..................... 712/202; 712/225; 712/227; 710/310; 711/132; 711/145; 711/144
(58) Field of Search .................. 710/310, 263, 710/132, 262, 122, 10, 104, 136, 129, 100, 400, 48, 267, 268; 714/36; 712/201.22, 228, 26, 42, 18, 27, 202; 703/23, 13, 102, 171, 173, 140, 136; 711/108, 725, 123, 122, 132, 160, 133, 134, 126, 137

(56) References Cited

U.S. PATENT DOCUMENTS

| | | | |
|---|---|---|---|
| 3,891,974 A | * 6/1975 | Coulter et al. | 703/13 |
| 4,069,510 A | 1/1978 | Carlow et al. | 710/48 |
| 4,106,091 A | 8/1978 | Hepworth et al. | 710/47 |
| 4,125,879 A | 11/1978 | Rodgers et al. | 365/236 |
| 4,326,247 A | 4/1982 | Chamberlin | 712/42 |
| 5,095,526 A | 3/1992 | Baum | 710/267 |
| 5,131,081 A | 7/1992 | MacKenna et al. | 710/22 |
| 5,187,791 A | 2/1993 | Baum | 710/268 |
| 5,319,753 A | 6/1994 | MacKenna et al. | 710/48 |
| 5,606,703 A | 2/1997 | Brady et al. | 710/264 |
| 5,634,118 A | * 5/1997 | Blomgren | 712/226 |
| 5,657,455 A | 8/1997 | Gates et al. | 710/100 |
| 5,659,690 A | 8/1997 | Stuber et al. | 710/129 |
| 5,666,559 A | 9/1997 | Wisor et al. | 710/32 |
| 5,684,982 A | 11/1997 | Gates | 713/400 |
| 5,689,726 A | 11/1997 | Lin | 710/10 |
| 5,701,409 A | 12/1997 | Gates | 714/41 |
| 5,708,815 A | 1/1998 | Poisner | 710/263 |
| 5,727,207 A | 3/1998 | Gates et al. | 713/100 |
| 5,729,719 A | 3/1998 | Gates | 710/400 |
| 5,748,806 A | 5/1998 | Gates | 710/126 |
| 5,819,112 A | 10/1998 | Kusters | 710/36 |

* cited by examiner

Primary Examiner—Daniel H. Pan
(74) Attorney, Agent, or Firm—Skjerven Morrill LLP

(57) ABSTRACT

A processor includes a stack that operates as a circular stack and appears to the address space in the memory of the processor as a single point address location. The stack supports read and write data access functions in addition to CALL (push) and RETURN (pop) programming operations. The processor may be programmed to save the stack in a typical manner with one instruction atomically transferring each element in the stack directly from the stack to a save storage. To restore the stack, the processor may be programmed to individually restore each element. The processor supports a special MOV instruction that transfers a plurality of bytes in a single operation. The special MOV instruction has one argument that identifies the beginning transfer source address, another argument defines the byte count indicating the number of bytes to be transferred, and a beginning transfer destination address. The processor may be programmed to perform a stack save operation with only a single instruction that moves the contents of the stack to the save storage. To further reduce context switching time and reduce the stack save and restore operation to a minimum number of instructions while maintaining the proper entry relationship for both stack read and write operations, the processor includes a "stack read forward" option to the special MOV instruction. The option to the special MOV instruction operates to read data in a forward direction even when no valid data is stored in the locations. The read operation begins at the start address specified by an argument to the MOV instruction, reads forward, and wraps around in a binary fashion back to the start address.

36 Claims, 22 Drawing Sheets

FIG. 17A

| PARITY | ALU/BRANCH CONTROL[4] | RT[1] | DESTINATION[9] | SOURCE ADDRESS[9] | IMMEDIATE[8] |
|---|---|---|---|---|---|
| 31 | 30 27 | 26 25 | 25 17 | 16 8 | 7 0 |

FIG. 17B

| PARITY | ALU/BRANCH CONTROL[4] | RT[1] | DESTINATION[9] | SOURCE ADDRESS[9] | SHIFT CONTROL[8] |
|---|---|---|---|---|---|
| 31 | 30 27 | 26 25 | 25 17 | 16 8 | 7 0 |

FIG. 17C

| PARITY | ALU/BRANCH CONTROL[4] | NEXT_ADDRESS[10] | SOURCE ADDRESS[9] | IMMEDIATE[8] |
|---|---|---|---|---|
| 31 | 30 27 | 25 17 | 16 8 | 7 0 |

FAST STACK SAVE AND RESTORE SYSTEM AND METHOD

This application claims benefit of provisional application No. 60/087,701 filed Jun. 2, 1998.

BACKGROUND OF THE INVENTION

1. Field of the Invention

The present invention relates to processors and processor stacks. More specifically, the present invention relates to a fast stack save and restore apparatus for a processor.

2. Description of the Related Art

In a computer or processor, a stack is a sequential data list stored in internal storage. A processor retrieves information from the stack by popping elements from the top of the stack in a last-in-first-out (LIFO) system or from the bottom of the stack in a first-in-first-out (FIFO) system, and stores information onto the stack by pushing elements to the stack. In contast, other storage structures are accessed simply by addressing individual elements by memory location.

A processor may utilize a stack that is stored in a plurality of locations in a storage such as a system memory. In other processors, a stack may be held within several dedicated registers. Under certain circumstances, such as a context switch of a processor, the stack is saved to preserve the processor context for a subsequent return to processing.

A processor typically performs a stack save operation by reading each entry in the stack and individually moving the entries to a save area. Similarly, the processor typically restores the stack by relocating each stack entry in the save area back to the stack while maintaining the original entry order relationship. Therefore a typical processor performs a save stack operation by reading the stack storage and writing each stack element into a save area of memory. The typical processor performs a restore stack operation by accessing single elements in the save area of memory and restoring each accessed stack element to the stack storage.

For example, a typical processor saves an eight entry stack through the execution of sixteen or more instructions. The sixteen or more instructions utilized by the typical processor include eight read operations of reading a stack entry into a temporary storage and writing the temporary storage to a stack save storage. A typical processor restores the eight element stack using another sixteen instructions, thirty-two operations for an overall read and restore operation.

Processor architectures are continually evolving to improve and extend the capabilities of computer systems. Execution speed, power consumption, and circuit size are aspects of processors and processor performance that are constantly addressed by architects and designers in the ongoing quest for an improved product.

Personal computers (PC's) such as microcomputers have gained widespread use in recent years primarily because they are inexpensive and yet powerful enough to handle computationally-intensive user applications. Data storage and data sharing functions of personal computers are often expanded by coupling a group of such computers to peripheral devices such as disk drives, tape drives, and printers. The peripheral devices and the personal computers are interconnected through a single communications network, such as a local area network.

The group of computers is coupled using interfaces that facilitate and accelerate communications among the computers and peripheral devices. A host adapter is a common interface device that is used to connect a first bus that has a specified protocol for transferring information over the first bus and a first data transfer speed to a second bus. The second bus also has a specified protocol for transferring information over the second bus at a second data transfer speed. The host adapter operates to transfer information between the first bus and the second bus.

A primary consideration of the performance of a network interface is data transfer speed. For an intelligent network interface that includes a processor for controlling and monitoring information transfer, execution speed of the processor is paramount. While the execution speed of the processor is fundamentally based on the clock speed of the processor, other aspects of processor performance may also strongly influence effective performance.

For example, for a processor within a network interface that includes a stack, the time expended for context switching may be highly determinative of effective data transfer speed.

What is needed is a system and technique for improving context switching speed of a processor by reducing the number of instructions that are executed during saving and restoring of a stack.

SUMMARY OF THE INVENTION

A processor includes a stack that operates as a circular stack and appears to the address space in the memory of the processor as a single point address location. The stack supports read and write data access functions in addition to CALL (push) and RETURN (pop) programming operations. The processor may be programmed to save the stack in a typical manner with one instruction automatically transferring each element in the stack directly from the stack to a save storage. To restore the stack, the processor may be programmed to individually restore each element.

The processor supports a special MOV instruction that transfers a plurality of bytes in a single operation. The special MOV instruction has one argument that identifies the beginning transfer source address, another argument defines the byte count indicating the number of bytes to be transferred, and a beginning transfer destination address. The processor may be programmed to perform a stack save operation with only a single instruction that moves the contents of the stack to the save storage.

To further reduce context switching time and reduce the stack save and restore operation to a minimum number of instructions while maintaining the proper entry relationship for both stack read and write operations, the processor includes a "stack read forward" option to the special MOV instruction. The option to the special MOV instruction operates to read data in a forward direction, the direction used when writing, even when no valid data may be stored in the locations. The read operation begins at the current stack write address pointer, reading forward causes the stack write pointer to increment, and wraps around in a binary fashion back to the initial address when the MOV instruction completes.

In an illustrative embodiment, a SAVSTKRDEN bit of a SEQCTL register is assigned that, when set, enables the save stack read operation to be performed with the MOV instruction of the processor. The SAVSTKRDEN bit is automatically cleared when the MOV count expires so that an additional instruction for clearing the bit is eliminated. In other embodiments, a bit in other registers may be utilized to control a forward read operation. In further additional embodiments, for example when a spare address space is available, one address may be assigned that enables the save stack read operation.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

FIGS. 17A, 17B, and 17C are pictorial illustrations of a first format, a second format, and a third format, respectively, for a command line for supplying instructions to the sequencer shown in FIG. 3.

The use of the same reference symbols in different drawings indicates similar or identical items.

DESCRIPTION OF THE PREFERRED EMBODIMENT(S)

Figure 1:
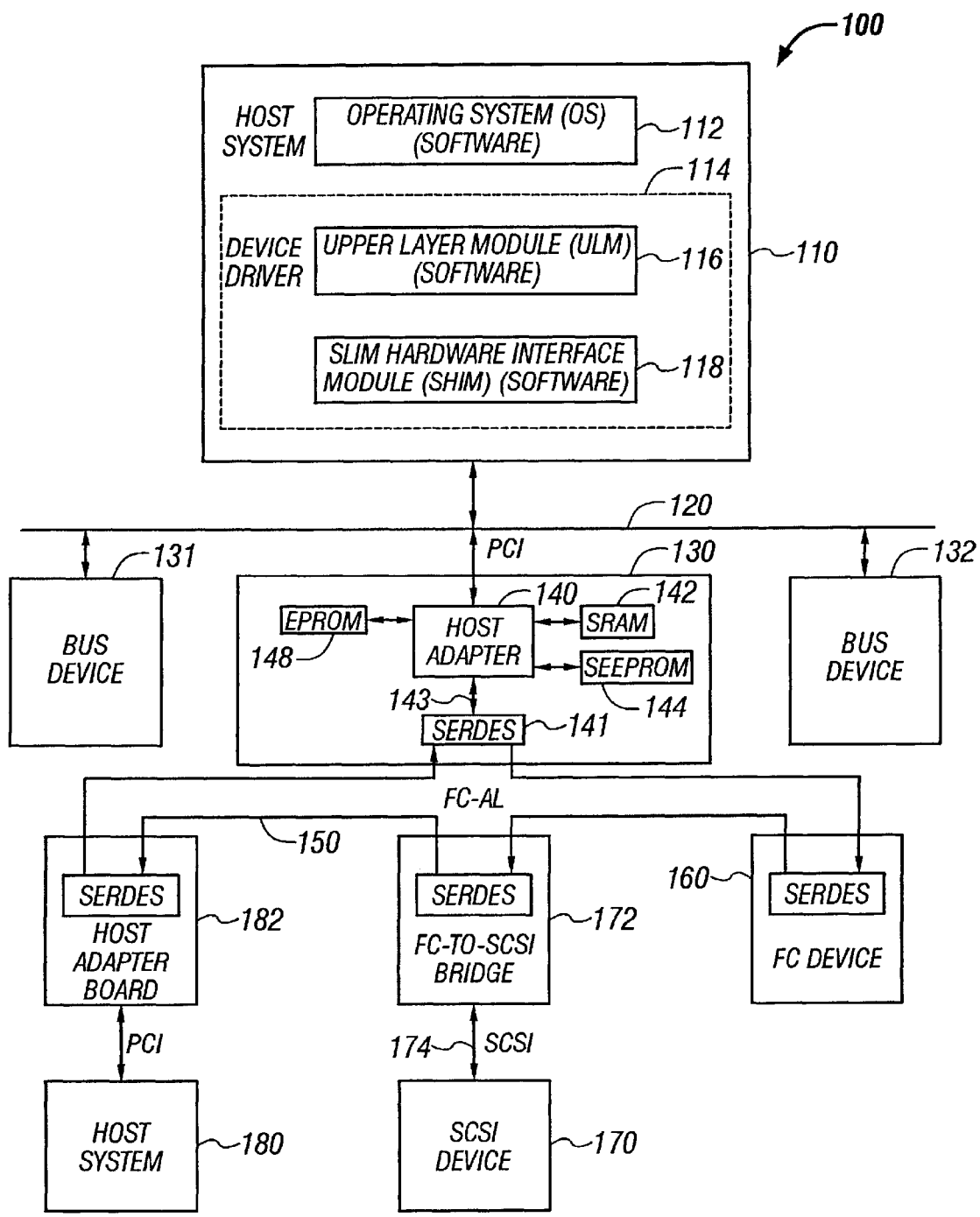
FIG. 1 is a block diagram showing a computer system including a system bus device and a host adapter in accordance with an embodiment of the invention.

A host adapter 140 is depicted FIG. 1, a schematic block diagram showing a computing system 100. The host adapter 140 functions as a high-speed data transfer interface between a Peripheral Component Interconnect(PCI) system and a serial Fibre Channel (FC) link 160 through usage of a media interface serializer/deserializer (SERDES) circuit. In an illustrative system, the host adapter 140 transfers data at a transfer rate on the order of a hundred megabytes per second.

The host adapter 140 is an intelligent interface that includes a processor, in the illustrative embodiment called a Multi-Tasking Protocol Engine 250, that controls high-speed data transfer of the interface. The Multi-tasking protocol engine 250 executes protocol commands described by a Transfer Control Block (TCB) and scatter/gather (S/G) lists to control the data transfer between the host system memory and the Fibre Channel connected device.

Figure 4:
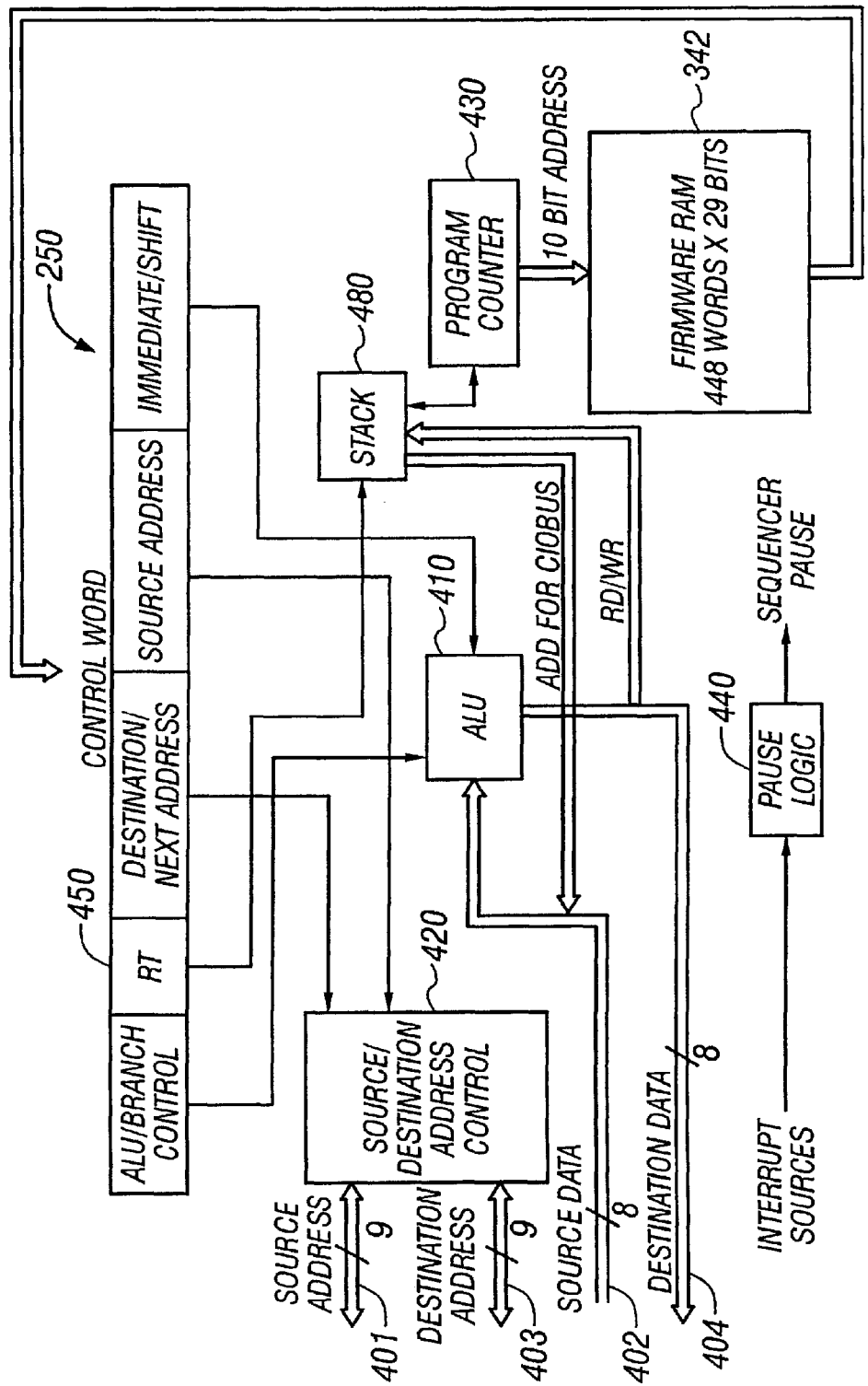
FIG. 4 is a block functional diagram illustrating the multitasking processor engine sequencer shown in FIG. 3.

The Multi-Tasking Protocol Engine 250 includes a stack 480, shown in FIG. 4, that operates as a circular stack and appears to the address space 140 of the Multi-Tasking Protocol Engine 250 as a single point address location. The stack 480 includes a read pointer and a write pointer, neither of which is accessible using I/O operations. Stack addressing is initialized so that the read address is first enabled, followed by the write address. Writing to the stack 480 stores two bytes into stack memory and advances both the read and write pointers by one. Therefore the last data written to the stack 480 is the first to be read. Reading from the stack 480 causes both the read pointer and the write pointer to decrement by one. The stack 480 also supports read and write data access functions in addition to CALL (push) and RETURN (pop) programming activities. The Multi-Tasking Protocol Engine 250 may be programmed to save the stack in a typical manner with one instruction atomically transferring each two-byte element in the stack 480 directly from the stack to a SRAM in sequencer memory 142. In the illustrative embodiment, the stack 480 includes eight elements so that eight instructions would be used to save the stack 480. To restore the stack 480, the Multi-Tasking Protocol Engine 250 may be programmed to individually restore each element so that a total of eight instructions would be executed to restore the sixteen-element stack 480 for an overall read and restore operation.

Advantageously, the Multi-Tasking Protocol Engine 250 supports a special MOV instruction that transfers a plurality of bytes in a single instruction. The special MOV instruction has one argument that identifies the beginning transfer source address, another argument defines the byte count indicating the number of bytes to be transferred, and a beginning transfer destination address. The Multi-Tasking Protocol Engine 250 may be advantageously programmed to perform a stack save operation with only a single instruction that moves the contents of the stack 480 to the SRAM memory 142. However, the Multi-Tasking Protocol Engine 250 includes source and destination addressing functionality that supports a fixed mode and an incrementing mode, but not a decrementing mode. Thus, the entry order that is stored in the SRAM 142 is the reverse order of the entry order read operation so that one technique for restoring the stack is to individually restore each element in the stack 480. Thus eight instructions are used to restore the stack 480 so that a complete stack save and restore operation that returns stack elements to the proper order includes a total of nine instructions.

To further reduce context switching time and reduce the stack save and restore operation to a minimum number of instructions while maintaining the proper entry relationship for both stack read and write operations, the Multi-Tasking Protocol Engine 250 includes a "stack read forward" option to the special MOV instruction. The option to the special MOV instruction operates to read data in a forward direction even when valid data may not be stored in the locations. The read operation begins at a buffer-to-stack write pointer location with the stack 480 single-point address specified by a "source address" argument to the MOV instruction, reads forward, and wraps around in a binary fashion back to the address of the previous current stack write pointer location. In the illustrative example, the MOV operations of the Multi-Tasking Protocol Engine 250 that are used for stack save and restore operations contain a byte count, sixteen, that matches the byte size of the stack 480, a "destination address" argument containing a specified write location in SRAM 142. In this example, each of the eight data transfers moves two-bytes for a total of sixteen bytes moved from the stack 480 to SRAM 142. The circular addressing wraps around to the initial address of the stack 480 according to the sixteen-byte size of the stack. If eight return addresses are pushed onto the stack 480, all entries are valid.

In an illustrative embodiment, a SAVSTKRDEN bit of a SEQCTL register is assigned that, when set, enables the save stack read operation that is issued with the MOV instruction of the Multi-Tasking Protocol Engine 250. The SAVSTKRDEN bit is automatically cleared when the MOV count expires so that an additional instruction for clearing the bit is eliminated. In other embodiments, a bit in other registers may be utilized to control a forward read operation. In further additional embodiments, for example when a spare address space is available, one address may be assigned that enables the save stack read operation.

In various other embodiments, variations of the MOV instruction may be used so long as the instructions are used to move data from a source sequence of addresses in a storage to a destination sequence of addresses.

The special MOV instruction and stack read forward functionality advantageously reduces to two the number of instructions to save and restore the stack when an address location of storage is allocated to enable the save stack read operation. The number of instructions to save and restore the stack is reduced to three, including an instruction for setting a bit in the register, when a register bit is used to enable the save stack read operation. In either case, the stack save and restore operation is made very fast and efficient with a minimum overhead.

FIG. 1 shows a computing system 100 in accordance with an embodiment of the invention. Computing system 100 includes a host computer 110, which has a system bus 120, and system bus devices 130 to 132 that are connected to system bus 120. Device 130 is a Fibre Channel controller integrated circuit (IC) component that includes a host adapter 140 for control of a peripheral bus 143 connected to a media interface serializer/deserializer (SERDES) 141 chipset to perform selectable parallel 20-bit or parallel 10-bit to serial high speed data transfers between a serial Fibre Channel (FC) loop 150 to FC device 160 and a parallel system Peripheral Component Interconnect (PCI) bus 120. The SERDES chipset performs parallel to serial send data conversion with internal high speed serial transmit clock generation, receive serial to parallel data conversion, receive word sync detection, receive data clock extraction, and serial data loopback functions. Host computer 110 can communicate via device 130, with devices 160, 170, and 180 that are connected to FC loop 150 and supports link module identification, attached media identification, and optical fiber safety sense and control. In particular, host computer 110 executes software including an operating system 112 and a device driver 114 for devices 160, 170, and 180. Device driver 130 includes a hardware interface module (HIM) 118 that communicates with device 130 via bus 120 and at least one upper layer module (ULM) 116 that communicates with devices 160, 170, and 180 via HIM 118 and device 130.

In an exemplary embodiment of the invention, host computer 110 is a personal computer, system bus 120 is an industry standard Peripheral Component Interconnect (PCI) bus, and bus 150 is a fiber channel (FC) serial bus. Device 130 is a PCI board in host computer 110. As an example, application of host adapter 140, devices 160, 170, and 180, which connect to bus 150, are respectively a fiber channel device including a SERDES device, a SCSI device such as a hard drive which connects to bus 150 via a bridge circuit 172 including a serializer/deserializer, and another computer system 180 having a board 182 including a SERDES device for connection and communications via fiber channel serial bus 150.

Host adapter 140 is a programmable integrated circuit that includes a multi-tasking protocol engine. The multi-tasking protocol engine executes software or firmware for controlling communications between host computer 110 and devices on bus 150. Coupled to host adapter 140 is a local memory including volatile memory 142 and non-volatile memory 144 and 148. Volatile memory 142, typically DRAM or SRAM and preferably a synchronous SRAM, is for information such as transfer control blocks for devices FC device 160, host system 180, and SCSI device 170. The non-volatile memory including a conventional EPROM, EEPROM or Flash memory 148, and an SEEPROM 144 for critical configuration information and non-critical information. In the exemplary embodiment, SEEPROM is a 1-Kbit memory that stores a world-wide port and node name, a local address, a subsystem-ID, a subsystem vendor ID, a preferred FC port address, external ROM/EEPROM size information, and other board related data. The world wide address is a world-wide unique address assigned to each port in the network and is represented as a 64-bit unsigned binary value. In addition, a 64-bit world wide node address is assigned to each node in a port. Also stored in SEEPROM 144 are the subsystem vendor ID and the subsystem board ID, represented as 16-bit binary values. An 8-bit preferred FC port address, which the address for device in an arbitrated loop, may also be stored in SEEPROM 144. U.S. Pat. No. 6,240,482 B1 issued on May 29, 2001, further describes the use and organization of the local memory space (e.g., memories 142, 144, and 146) of a host adapter and is hereby incorporated by reference in its entirety.

Figure 2:
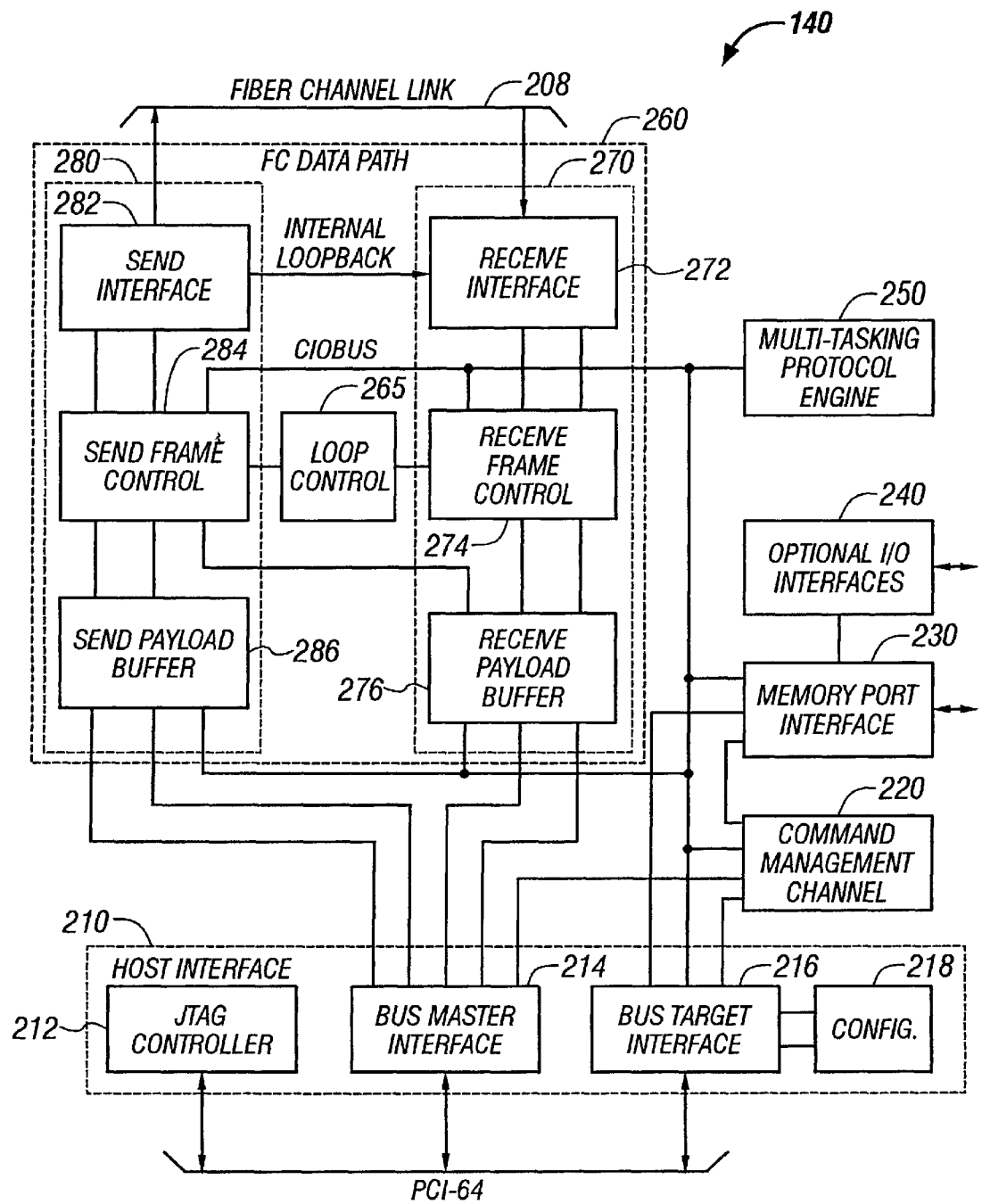
FIG. 2 is a block diagram that illustrates the host adapter shown in FIG. 1.

FIG. 2 is a block diagram of the exemplary embodiment of host adapter 140. In the exemplary embodiment, host adapter 140 includes a host interface 210, a command management channel 220, a memory port interface 230, a multi-tasking protocol engine 250, and a fiber channel data path 260. Host interface 210 connects to system bus 120 and implements the PCI bus protocols which permits adapter 140 to act as either the bus master or target. As illustrated in FIG. 2, host interface 210 includes JTAG circuitry 212 for JTAG circuit testing, a bus master interface 214 that implements PCI bus master protocols, and a bus target interface 216 that implements the protocols for a target on PCI bus 120. Configuration registers 218 contain configuration data for PCI interface 210 including a device base address and an interrupt request (IRQ).

JTAG circuitry 212 includes a JTAG compatible test port for I/O boundary scans such as multiple core scan loops. The JTAG circuitry 212 further includes an I/O pad internal pull-up, pull-down disable for $I_{ddq}$ testing, an input pad NAND ring test mode, and independent output tri-state control.

In alternative embodiments of the invention, host interface 210 can employ any alternative host interface architecture including any of the PCI interface circuits that are known in the art. In one embodiment, the PCI interface 210 functions as a full featured PCI 64/32-bit bus master with zero wait state transfer capability and performs PCI cacheline data transfer commands including streaming transfers to enhance host system memory access.

Transfer command blocks (TCBs) are transferred to and from the PCI system memory via the command management channel 220. The TCBs are issued from the host to specify the details of the data transfer, such as direction, length, and address of the data in the target. The command management channel 220 includes a hardware control register called the CMC Host Control register. The CMC Host Control register operates in conjunction with two registers in the host interface 210, a Host Command 0 register and a Host Command 1 register, to support device driver control of hardware features in the host adapter 140.

FC data path 260 contains two sets of flexible flow-through style data buffers forming pathways for information sent or received via a fiber channel link (i.e., peripheral bus 150). As shown in FIG. 2, FC data path 260 includes a receive data path 270 for information received from the fiber channel link in FC receive link to PCI local bus 120 data transfers, a send data path 280 for information to be sent on the fiber channel link in PCI local bus 120 to FC send link data transfers, and a loop back control circuit 265 for supporting link diagnostics such as internal loopback control. The loop back control circuit 265 further supports arbitrated loop operations including private loops, public loops, private and public loop auto-detection, and alias addresses. U.S. Pat. No. 6,070,200 issued on May 30, 2000 and U.S. Pat. No. 6,202,105 issued on Mar. 13, 2001 further describe the operation of an exemplary embodiment of FC data path 260 and components therein and are hereby incorporated by reference herein in their entirety.

The send payload buffer 286 in the send data path 280 and the receive payload buffer 276 in the receive data path 270 each accepts up to a configured frame payload size of 2048, 1024, 512, 256, or 128 bytes and allows a current or future frame payload to be filling while previous frame payloads are emptying. Send payload buffer 286 are configured to match the receive payload buffer login size of FC device 160, FC/SCSI bridge 172, or host adapter 182 at the receive port of the frame. Receive payload buffers 276 are configured to the host adapter 140 login size and accept payloads less than or equal to the configured size.

Each of the send payload buffer 286 and the receive payload buffer 276 data buffer set has a payload manager that contains a Scatter/Gather (S/G) capable Direct Memory Access (DMA) channel for transferring buffer data to/from the PCI local bus 120. The DMA channel contains an S/G element First-In-First-Out (FIFO) buffer (not shown) that allows future S/G list elements to be stored while the current element is being processed by the DMA channel. S/G elements are prefetched from an S/G list cached in a synchronous Static Random Access Memory (SRAM) 142 connected to the Memory Port Interface (MPI) 230 block and stored in the DMA FIFO by the Multi-Tasking Protocol Engine 250. S/G prefetching to the DMA FIFO minimizes the transfer delay to/from the PCI local bus 120 when completing one element and starting the next, as the transfer proceeds without delay. The two DMA channels enable different commands to be processed concurrently with data transferred in both directions in data path 270. When a S/G list is emptied without detecting the end of the list, then the S/G list is refilled from system memory in host computer 110 using the DMA channel in command management channel 220.

Multi-tasking protocol engine 250 executes protocol commands described by a Transfer Control Block (TCB) and scatter/gather (S/G) lists to control the data transfer between the host system memory and the Fibre Channel connected device. A TCB is a data structure that contains all information for the execution of a command. TCBs are prepared by the device driver in a host system memory TCB array along with the associated S/G elements. In the illustrative computing system 100, the Fibre Channel (FC) device 160 executes high-speed Fibre Channel protocol transfers with the Multi-Tasking Protocol Engine 250 performing initialization and monitoring functions. The Multi-Tasking Protocol Engine 250 handles Fibre Channel protocol transfers by executing operations based on a clock rate referenced to a Fibre Channel clock (not shown). Multi-tasking protocol engine 250 transfers TCBs from system memory to local memory 142 of host adapter 140 for access when host computer 110 indicates the TCBs are available. Multi-tasking protocol engine 250 connects via an internal bus CIOBUS to memory port interface 230 which provides access to the local memory. Bus CIOBUS connects to multi-tasking protocol engine 250, memory port interface 230, FC data path 260, command management channel 220, and host interface 210. To access local memory, multi-tasking protocol engine 250 first acquires control of bus CIOBUS from a bus arbitrator (not shown). Multi-tasking protocol engine 250 can then read from local memory via memory port interface 230, from a buffer memory in command management channel 220, or from host interface 210. Host interface 210 or command management channel 220 can similarly acquire control of internal bus CIOBUS and access memory via memory port interface 230.

The Multi-Tasking Protocol Engine 250 uses the command management channel 220 DMA channel to transfer TCBs from the TCB array in the host system memory to a TCB synchronous SRAM array 142 connected to the memory port interface 230. The Multi-Tasking Protocol Engine 250 transfers the contents of a TCB to the appropriate registers for execution. The TCBs are executed independently of the Fibre Channel Target ID in the order received. The Multi-Tasking Protocol Engine 250 handles all normal protocol command activity with or without a host system interrupt upon command completion.

The memory port interface 230 is used to access devices that are external to the host adapter 140. Memory port interface 230 provides an interface to local memory including volatile memory 142 and non-volatile memory 144 and 148. Memory port interface 230 also controls other I/O interfaces 240. I/O interfaces 240 implement a variety of functions including a general purpose interface, an external request interface, an activity indicator interface, a monitor interface, and a test interface. The general purpose interface includes sets of generic, addressable pins for input and output signals. The external request interface provides for an external pause request and acknowledge for Peek/Poke operations that respectively read or write data to a specified memory location, a firmware load request and acknowledge, and an external interrupt of host adapter 140. The activity indicator interface is an LED indicator output port for indicating the activity of host adapter 140. The monitor interface allows selection of internal signals from within host adapter 140 for external monitoring. The monitor port interface is generally used during debugging of host adapter 140 during initial design and testing. U.S. Pat. No. 6,311,303 issued on Oct. 30, 2001 describes a monitor port with selectable trace support which is employed in the exemplary embodiment of the invention and is hereby incorporated by reference in its entirety. The test interface provides for initiation and output of results of self tests performed within host adapter 140. Interfaces 240, while useful, are not required and can be omitted. Additionally, other types of interface can be added according to the functions of the adapter 140.

Figure 3:
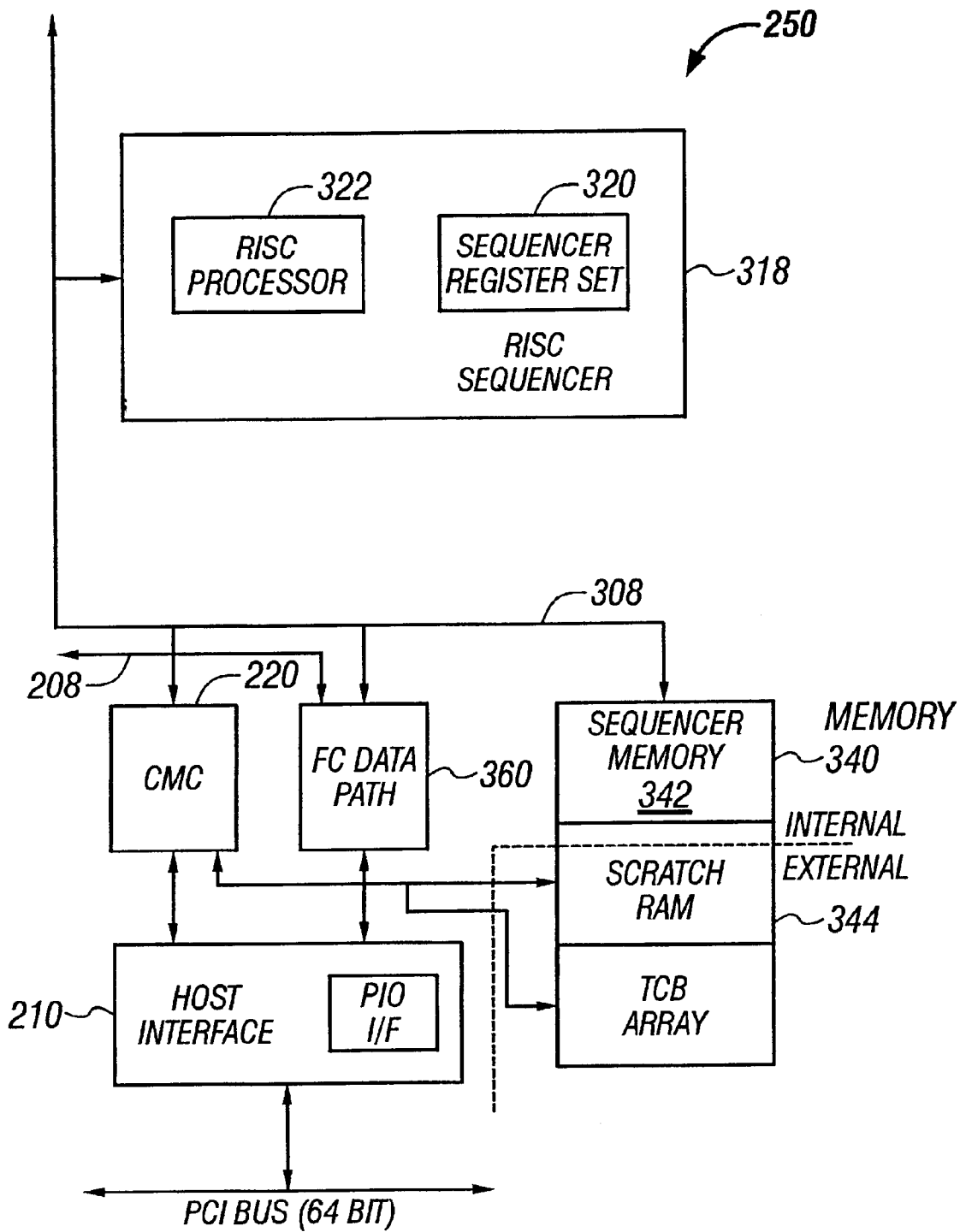
FIG. 3 is a block diagram showing selected circuit blocks of the host adapter, specifically showing blocks that relate to a processor within the host adapter.

Referring to FIG. 3, a schematic block diagram shows the Multi-Tasking Protocol Engine 250, within the host adapter 140 in additional detail. The Multi-Tasking Protocol Engine 250 functions as a multitasking processor engine and includes a sequencer random access memory (RAM) that is illustratively shown as a sequencer memory 342, a RISC processor 322, and a sequencer register set 320. In the illustrative Multi-Tasking Protocol Engine 250, the sequencer memory 342 is an internal SRAM firmware storage with 1024 instruction lines (32-bit words with parity).

The Multi-Tasking Protocol Engine 250 includes a RISC sequencer 318, a data first-in-first-out (FIFO) memory circuit 360, and a memory 340. The RISC sequencer 318, FIFO memory circuit 360, memory 340 and the host interface circuit 210 are interconnected by a data transfer bus structure, a CIOBUS 308, to form a high speed path for transfer of data between the computer bus, illustratively PCI bus 120, and the FC link 208. The CIOBUS 308 interconnects the sequencer 318, data FIFO memory circuit 360, memory 340, and host interface module 210 to control the host adapter integrated circuit 140 both by a host microprocessor (not shown) through a host adapter driver (not shown) and by the sequencer 318.

The sequencer register set 320 includes a plurality of registers having various characteristics such as read-only, write-only, or read-write access characteristics. The plurality of registers include bits that are selectively cleared or set upon the occurrence of a reset signal. Registers in the sequencer register set 320 include a sequencer control register SEQCTL that contains bits for controlling operation of sequencer 250. A sequencer Ram data register SEQRAM is a port to the sequencer memory 342. The sequencer memory 342 is loaded by pausing the sequencer 250 and then asserting a bit LOADRAM in the register SEQCTL. A starting address is written into sequencer address registers SEQADDR0 and SEQADDR1 before writing to the SEQRAM register. The byte ordering begins with the least significant byte and ends with the most significant byte. The address automatically increments after the most significant byte is written to facilitate program loading.

Sequencer address registers SEQADDR contain the address of the instruction within sequencer memory 342 that is executed on the next clock edge. The registers are written to change the execution location after pausing the sequencer 250 or are written during execution by the sequencer 250. SEQADDR may be written when the sequencer 250 is not paused, thereby performing an indirect jump instruction. The SEQADDR registers are also used to specify the starting location when loading sequencer firmware in a host adapter initialization process. The starting location address is automatically incremented while loading the sequencer firmware after every second word. The second word index is set when the first word is written and is cleared when the second word is written. Clearing the LOADRAM bit clears the second word index, if set. SEQADDR powers up to a default value of zero.

Accumulator register ACCUM is a temporary holding cell for arithmetic or logical operations. ACCUM is the second source to the ALU when the value of the 'immediate' field in the microcode word, which is described more completely below, is zero. An exception to this is for ORI operations where operand2 is always the value contained in the immediate field. All bits of this register power up to a value of zero.

A source index register SINDEX is a default destination register, a temporary holding register, or is used as an indirect address for source operands for some ALU operations. SINDEX increments by one or two for each data transfer, but does not increment when addressing a data port during a MOV instruction until the byte count expires. All SINDEX register bits power up to a value of zero.

Destination index register DINDEX is a temporary holding register or is used as an indirect address for destination operands for some ALU operations. DINDEX increments by one or two for each data transfer, but does not increment when addressing a data port during a MOV instruction until the byte count expires. All DINDEX bits power up to a value of zero.

Break address register BRKADDR0/1 is used for diagnostic purposes to halt sequencer 250 at a specified address. BRKADDR0 is loaded with the lower eight bits of a break address. All BRKADDR0/1 bits power up to a value of zero. BRKADDR1 is loaded with the upper two bits of the break address and bit 7 operates as a break condition disable. To break at an instruction located at address 'X' in the sequencer memory 342, the value of the break address should be X such that the instruction at address X is the logical outcome of the instruction located at X. The SEQADDR after the break condition will be X+1 for in-line code or Y+1 for the next address as a result of a jump or CALL action.

ALLONES register contains the hexadecimal value FFFFh to supply the value of FFFFh to an operand in an ALU 410, or other memory location or register. ALLZEROS register contains the hexadecimal value 0000h to supply the value of 0000h to an operand in the ALU 410, other register, or other memory location. NONE register is written to a destination when no change is to be made to the destination. Carry and zero flags register FLAGS stores the carry flag and the zero flag.

SINDIR register is an indirect address for a source register that is used for indirectly addressing the source data. A transfer from SINDIR register utilizes the contents of register SINDEX as the source address. The contents of register SINDEX are auto-incremented the clock cycle after SINDIR register is addressed except when SINDEX addresses a data port during a MOV instruction until the byte count expires.

DINDIR register is an indirect address destination register for indirectly addressing the destination write register DINDEX. When a transfer is made to the destination, the contents of register DINDEX identify the destination address. The contents of register DINDEX are auto-incremented the clock cycle after DINDIR has been addressed except when DINDEX addresses a data port during a MOV instruction until the byte count expires.

FUNCTION1 register is used for the sequencer 250 to perform a special function that reduces the number of instructions executed. Data is written to registers FUNCTION1 with valid data in bits 6 to 4 that is decoded into one of eight bit positions. For example, a value of zero sets a value "1" in bit position zero. A value of one gives a value "1" in bit position one, and the like, with all other bit positions having a value of zero.

STACK is a sequencer stack register that supplies a stack function for the sequencer 250. In the illustrative system, the stack is a circular, eight-element stack. Contents of the stack are reported in one word elements at a time starting from the last location pushed on the stack until all entries are reported. The stack entries are reported on consecutive reads. A location zero points to the last pushed entry. A location one points to the entry pushed previous to the last entry, and so on. The stack pointer increments after a read. Therefore, eight reads are made to restore the location of the pointer to the original value to continue proper program execution.

Registers in the multi-tasking protocol engine 250 include a STACK register, a sequencer RAM address (SEQADDR) register, and a sequencer control (SEQCTL) register. The STACK register is a data port that supports word access only. STACK register performs a circular stack function containing eight levels, each a full sixteen bits wide to allow word storage when saved. Contents of the STACK register are readable and writeable by the multi-tasking protocol engine 250 or the host computer 110. The STACK normally contains the sequencer RAM address value (SEQADDR), but is optionally used as a temporary data holding register.

The Multi-Tasking Protocol Engine 250 includes a stack 480 that has a depth of eight instruction addresses. Circuits (not shown) for the stack 480 support a stack save operation for a fast firmware context exchange. The multi-tasking protocol engine 250 pushes and pops values to and from the stack 480 during execution of CALL and RET instructions, respectively. Entries in the stack 480 are popped by consecutive read operations of the STACK register. The stack 480 entries are popped one word at a time, starting from the last location pushed, until all entries are popped. The stack 480 supports multiple operations in the same instruction, attaining powerful subroutine support. For example, a value may be pushed onto the stack 480, the value may be then popped from the stack 480 with the return action pointed to by the value pushed onto the stack 480.

The STACK register, in combination with a SAVSTKRDEN bit of the SEQCTL register, support a fast context save and restore operation.

A push operation of the stack 480 functions as follows. A new value, specifically the current value in the sequencer RAM address (SEQADDR) register plus one, is stored in the next position in the stack 480 that is available for writing. The internal write pointer of the stack 480 is then incremented to point to the next position, the new next position that is available for writing. The internal read pointer of stack 480 is also incremented to the position that the last new data was written.

A pop operation of the stack 480 functions as follows. The current value in the stack 480 that is available for reading is used to access the next instruction to be executed and that value plus one is stored in the sequencer RAM address (SEQADDR) register. The internal pointer of the stack 480 is then decremented to indicate the next entry available for reading. The read pointer is always equal to the write pointer minus one.

The sequencer control (SEQCTL) register is a read/write register that selects operating features in the multi-tasking protocol engine 250. One bit of the sequencer control (SEQCTL) register is a save stack read enable (SAVSTKRDEN) bit, when set, permits access to the STACK register as the source of a MOV instruction with a count equal to sixteen bytes. The save stack read enable (SAVSTKRDEN) bit automatically is cleared at the end of the MOV instruction. Data is stored in the destination in a format that enables the data to be restored in the Stack register in the same order as the order prior to the save stack read access. To restore the data in the STACK register, a MOV instruction is executed with save stack read enable (SAVSTKRDEN) bit cleared, the STACK register set as the destination, and the count equal to sixteen bytes.

The sequencer RAM address (SEQADDR) register is a read/write register that supports I/O word accesses only. The sequencer RAM address (SEQADDR) register contains the address of the sequencer RAM location that may be executed on the next instruction cycle when the multi-tasking protocol engine 250 is executing. The sequencer RAM address (SEQADDR) register, when the sequencer control (SEQCTL) register LOADRAM bit is set, specifies the starting location when instructions are loaded to or read from the sequencer RAM. The address in the sequencer RAM address (SEQADDR) register increments after every second word during the loading or reading of instructions.

The host computer 110 writes a value to sequencer RAM address (SEQADDR) register with the sequencer control (SEQCTL) register LOADRAM bit clear then restarts the multi-tasking protocol engine 250 by writing a 0 value to CMC host control register bits HPAUSETOP and HPAUSE. In response, instruction execution begins at the instruction identified by the value written by the host computer 110 and the value plus one is stored in the sequencer RAM address (SEQADDR) register.

In one example of the operation of the sequencer RAM address (SEQADDR) register, the multi-tasking protocol engine 250 writes a value to sequencer RAM address (SEQADDR) register with a MOV instruction that contains a byte count equal to two. In response, the instruction identified by the value is the next instruction to be performed and the value plus one is stored in the sequencer RAM address (SEQADDR) register.

In another example, the multi-tasking protocol engine 250 executes a RET instruction or an instruction containing an attached RET field. In response, the last value stored in the STACK register causes the instruction identified by the value to be the next instruction executed and the value plus one is stored in the sequencer RAM address (SEQADDR) register.

When a CALL instruction is executed, the value in the sequencer RAM address (SEQADDR) register is pushed onto the STACK register. The instruction identified by the value in the next address field of the CALL instruction is the next instruction to be executed, and the value plus one is stored in the sequencer RAM address (SEQADDR) register.

For execution of a JUM, JC, JNC, JZ, or JNZ instruction in which the jump or branch is the action executed, then the instruction identified by the next address field of the instruction is the next instruction to be executed. The next address field value plus one is stored in the sequencer RAM address (SEQADDR) register.

When a 1 is written to a SEQRESET bit of a sequencer control[1] register, the value in the sequencer RAM address (SEQADDR) register is cleared to zero. The instruction identified by zero is the next instruction to be executed and one is stored in the sequencer RAM address (SEQADDR) register.

If an external firmware load control function, which is initiated by asserting an EXFLR signal, is completed with bit EXFLR_ADR_START clear, then sequencer RAM address (SEQADDR) register is cleared to zero. The instruction identified by the zero value is the next instruction to be executed, and the next instruction value plus one is stored in the sequencer RAM address (SEQADDR) register. If an external firmware load control function is completed with bit EXFLR_ADR_START set, the instruction identified by the value in an external load address[9:0] register is the next instruction to be executed and the next instruction value plus one is written to sequencer RAM address (SEQADDR) register.

The sequencer RAM address (SEQADDR) register is cleared by writing 0000h to sequencer RAM address (SEQADDR) register, or by writing a 1 value to CHIPRST bit of the CMC 220 host control register.

The CIOBUS 308 includes (i) a source bus with separate address and data buses, (ii) a destination bus with separate address and data buses, and (iii) a plurality of control signal lines. CIOBUS 308 supports high speed normal operations that are controlled by sequencer 318 as well as slower but extended operations during error recovery that are controlled by the host adapter driver using the host microprocessor.

The structure of CIOBUS 308 is selected to increase the speed of host adapter 140 and to reduce command overhead. Command overhead is defined as the time utilized for the host adapter 140 to process a FC command. The CIOBUS 308 transfers data from one part of the host adapter 140 to another in less than 40 nanoseconds (ns), allowing 26.6 Mega-instructions per second (MIPS) operation. CIOBUS 308 transfers data at more than an order of magnitude faster than current conventional embedded microprocessor host adapter designs. Splitting of CIOBUS 308 into source buses and destination buses allows each sequencer instruction to be completed in a single sequencer clock cycle. In contrast, multiple cycles are used on a shared bus. Furthermore, in some cases a write operation and a read operation are performed simultaneously over CIOBUS 308.

Host interface module 210 performs functional control operations controlling the host adapter 140 either as a bus slave or a bus master that transfers data and commands between host computer bus 120 and CIOBUS 308. In one exemplary system, all data transfers between host interface module 210 and host computer bus 120 are direct memory access (DMA) transfers. The term "DMA transfer" refers an information transfer in which the starting address for the information and the length of the information are supplied to a DMA hardware circuit and the DMA hardware circuit handles the data transfer.

Sequencer 318 handles all normal phase sequences of signals on the FC link 208 without intervention from the host adapter driver. Sequencer 318 also controls DMA and PIO data transfers. Sequencer 318 not only manages the basic protocol on the FC link 208, but also handles more advanced features usually handled by a host microprocessor.

Sequencer 318 includes the RISC processor 322 that operates with a single clock and completes each sequencer instruction in one sequencer clock cycle. In contrast conventional RISC processors require multiple overlapping clocks to achieve one instruction per clock cycle operation. All memory addressed by sequencer 318 and all the sequencer firmware 342 are contained within a memory 340.

A fibre channel (FC) data path circuit is disclosed in U.S. Pat. No. 6,070,200 issued on May 30, 2000, titled "A Host Adapter Having Paged Buffers for Simultaneously Transferring Data between a Computer Bus and a Peripheral Bus", which is hereby incorporated by reference herein in its entirety. Data FIFO memory circuit 360 is included in host adapter 140 to improve data transfer efficiency. A data threshold for data FIFO memory circuit 360 is programmable based on the relative data transfer speeds of computer bus 120 and FC link 208. At a data rate that exceeds the data threshold, data FIFO memory circuit 360 supplies an enable signal to host interface module 210. The host interface module 210 responds by asserting a signal on host computer bus 120 that requests control of bus 120 as a bus master. Host adapter 140 takes control of host computer bus 120 only when host adapter 140 is ready to transfer or receive data from bus 120. The host adapter 140 is thereby configured to effectively utilize both FC link 208 and computer bus 120 to reduce degradation of system performance commonly associated with the inefficient utilization of buses by prior art host adapters.

Referring to FIG. 4, a schematic block diagram illustrates the RISC processor 322 in additional detail. The RISC processor 322 includes (i) a pipeline register 450 that contains a sequencer command line; (ii) an ALU 410; and (iii) source and destination address control logic 420 that includes next address generation logic. The ALU 410 and the source and destination address control logic 420 are functional or execution units of the Multi-Tasking Protocol Engine 250 that execute various instructions including data moving (loading and storing) instructions, arithmetic instructions, and logical instructions. CSDAT bus 402 is a first input port of ALU 410 and is connected to the source data section of CIOBUS 308. A second input port to the ALU 410 is driven either by a pipeline register 450 or a temporary holding register accumulator. CDDAT bus 404 is an output port of ALU 410 and drives a destination data section of CIOBUS 308.

The source and destination address control logic 420 generates source and destination addresses for a special multiple-byte MOV_BLK instruction that is useful for moving blocks of data from and to selected addresses in memory. The source and destination address control logic 420 receives a starting destination address from the destination field of the a pipeline register 450, a starting source address from the source field of the a pipeline register 450, and a byte count from the immediate/shift field of the a pipeline register 450. The source and destination address control logic 420 includes an internal counter (not shown) that counts each data transfer of the multiple-byte transfer and an incrementer (not shown) for both the source address and the destination address. A save stack read enable (SAVSTKRDEN) bit (not shown) of a SEQCTL register causes a read of the stack 480 to use the write pointer for reading and incrementing after each stack read. The signal is automatically cleared at the end of a MOV instruction.

A typical sequencer cycle begins with the setting of an address on CSADR bus 401, the source address section of CIOBUS 308. The sequencer cycle continues with operations of receiving source data from CSDAT bus 402, operating on the source data with a selected ALU operation, and writing the result of the operation over the destination data section of CIOBUS 308 to the destination specified by the address on CDADR bus 403, the destination address portion of CIOBUS 308. Optionally, the result of the ALU operation may be examined for a zero value or a non-zero value, and the next address to sequencer memory 342 modified accordingly. The next sequencer RAM address may be explicitly changed and the incremental address saved, to affect a subroutine call and return. RISC processor 322 supports up to eight levels of subroutine calls.

The Multi-Tasking Protocol Engine 250 and constituent RISC processor 322 are designed to reduce the time expended to complete sequencer cycle operations, resulting in high-speed operation. In addition to high speed, ALU 410 has logic AND, OR, XOR, and ADD functionality. RISC processor 322 tests any bit or combination of bits within one clock cycle for a one or zero and jump or call a subroutine as a result of the test. ALU 410 has source and destination index registers that are typically used for multi-byte transfers or additions, allowing Multi-Tasking Protocol Engine 250 to make decisions based on the state of FC link 208, data path hardware elements, and a software driver (not shown).

The memory 340 includes a scratch RAM area 344 that is available for temporary storage of state information. For example, in an illustrative embodiment a sequencer stack 480 is maintained in scratch RAM 344. The sequencer memory 342 is a single-port RAM 1K×32 bits. Read and write control circuit is driven by the plurality of control lines in CIOBUS 308 as well as CSADR bus 401 and CDADR bus 403. The RAM receives data from CDDAT bus 404 and drives CSDAT bus 402.

A sequencer firmware, which is also called sequencer memory 342, has an instruction set including instructions supporting implementation of extended SCSI protocols for execution by Multi-Tasking Protocol Engine 250 without intervention by the software driver. An ability to save the condition of a disconnected command allows Multi-Tasking Protocol Engine 250 to queue commands on host adapter 140.

Sequencer firmware 342 supports several debug features including breakpoints and single-stepping. A breakpoint can be set to stop Multi-Tasking Protocol Engine 250 at any address. Once stopped, Multi-Tasking Protocol Engine 250 can be stepped one instruction at a time. Sequencer stack 480 is readable to determine stack contents.

Host interface module 210 controls signals and data paths to automatically transfer data, as a bus master, onto host computer bus 120. The host interface module 210 transfers 8-, 16-, 24-, or 32-bit wide data onto host computer bus 120 when the bus is a 32-bit bus. The host interface module 210 transfers 8-, 16-, 24-, 32-, 40-, 48-, 56-, or 64-bit wide data onto host computer bus 120 when the bus is a 64-bit bus. I/O transfers from and to host microprocessor are 8-bit or 16-bit transfers to reduce the logic internal to host adapter 140 and consequently the die size.

Data FIFO memory circuit 360 buffers data to maintain data streaming from one bus to the other. The rate of transfer of FC link 208 and host computer bus 120 is generally different. Data FIFO memory circuit 360 supports functions of speed matching and minimal host bus time usage by bursting data at the host bus maximum rate.

ALU 410 executes normal logical operations including the functions OR, AND, XOR. When the immediate field is zero, operand2 is the accumulator (not shown). When the immediate field is non-zero, operand2 is the immediate field 250. The carry flag is not altered for the OR, AND, and XOR instructions. Function ADD performs a normal arithmetic addition. When the immediate field is zero, operand2 is the accumulator. When the immediate field is non-zero, operand2 is the immediate. The carry is not added to the source register contents and operand2. The carry flag is set to one if the sum overflows, and to zero for no overflow. Function ADC performs a normal arithmetic addition. When the immediate field is zero, operand2 is the accumulator. When the immediate field is non-zero, operand2 is the immediate. The carry is added to the source register contents and operand2. The carry flag is set to one if the sum overflows, and to zero for no overflow. Function ORI logically ORs the source register with the immediate field for all values of the immediate. Destination of the result is source index register, SINDEX. Function ROL rotates left the value in the source register as specified by the 'shift control' field. The carry flag is altered.

Four bits in a command line encode branch control instructions for ALU 410. The branch control instructions include:

| BRANCH TYPE | DESCRIPTION |
|---|---|
| JMP | Unconditional jump to address in next address field |
| JZ | Conditional jump to address in next address field on zero result |
| JNZ | Conditional jump to address in next address field on non-zero result |
| JC | Conditional jump to address in next address field on saved carry equals "1" |
| JNC | Conditional jump to address in next address field on saved carry equals "0" |
| CALL | Unconditional call to subroutine at address in next address field (push next address + 1 onto stack for the return) |
| RET | Performs an unconditional subroutine return to the address stored on the top of stack |
| NB | No branch Go to next instruction. |

For a jump on zero JZ, if the result of the operation in the current command line is zero, program execution branches to the address specified in the 'next address' field. Otherwise the next command line executed is the next command line in the program list. For jump on not zero JNZ, if the result of the operation in the current command line is not zero, program execution branches to the address specified in the 'next address' field. Otherwise, the next command line executed is the next command line in the program list. The zero flag is altered by every command line so that zero flag state after a command cannot be tested by a following command.

For jump on carry JC, if the last command which alters the carry flag has set the carry flag, program execution branches to the address specified in the 'next address' field of the current command. If the last command reset the carry flag, the next command line executed after the current command is the next command line in the program list. The carry flag is altered only by commands which require a destination field. Jump on carry JC branch requires a 'next address' field. Since the 'next address' and destination fields are shared by the command line, the jump on carry branch control cannot coexist on the same command line with an ALU function that alters the carry flag. Therefore, branch is a function of the carry state defined by a previous command the jump on carry.

For jump on not carry JNC, if the last command which alters the carry flag has reset the carry flag, program execution branches to the address specified in the 'next address' field of the current command. If the last command set the carry flag, the next command line executed after the current command is the next command line in the program list. The carry flag is altered by the commands which require a destination field. The jump on not carry branch requires a 'next address' field. Since the 'next address' and destination fields are shared on the command line, the jump on not carry branch control cannot coexist on the same command line with an ALU function that alters the carry flag. Therefore, the jump on not carry branch is a function of the carry state defined by a previous command.

For a subroutine call (CALL), program execution branches unconditionally via a subroutine call to the address specified in 'next address' field. The address of the current command line, incremented by one, is pushed onto the stack 480.

For subroutine return (RET), program execution branches unconditionally via a subroutine return to the address saved on the top of the stack 480. The return address is popped off the stack. A 'next address' field is not required for this branch. Subroutine return is the only branch control which is not encoded in the ALU/branch control field, but rather is specified in the return field RT.

For no branch NB, no branch in program execution is taken. The next command line executed after the current command is the next command line in the program list. Since no branch is taken, no next address field is included on the command line.

Figure 5:
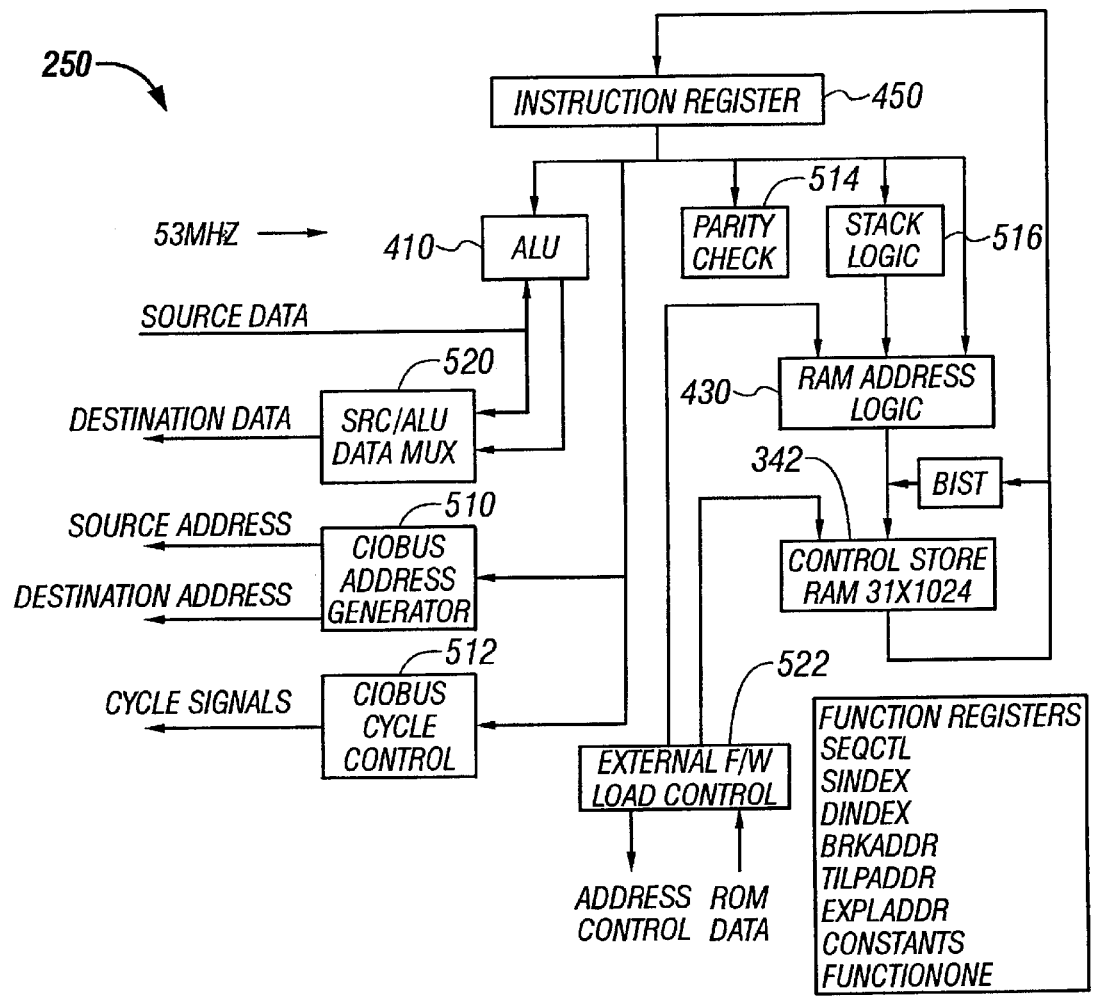
FIG. 5 is a schematic high-level block diagram that illustrates alternative aspects of the Multi-Tasking Protocol Engine.

Referring to FIG. 5, a schematic high-level block diagram illustrates alternative aspects of the Multi-Tasking Protocol Engine 250. The Multi-Tasking Protocol Engine 250 includes the pipeline instruction register 450 that receives instructions from the control store RAM (31×1024) 342, and directs bit information in various fields of the instruction to functional units for execution of the instruction. The pipeline instruction register 450 supplies instruction fields to an ALU 410, a CIOBUS address generator 510, a CIOBUS cycle control block 512, a parity check block 514, the stack 480 including a stack logic block 516, and the program counter 430. The ALU 410 executes arithmetic and logic instructions as directed by the pipeline instruction register 450, operating on source data from external to the Multi-Tasking Protocol Engine 250 and generating result data that is transferred from the Multi-Tasking Protocol Engine 250 via a source/ALU data multiplexer 520.

The stack logic block 480 includes a stack storage and control circuitry and is also connected to the program counter 430. The program counter 430 controls instruction access of the control store RAM 342. Access to instructions in the control store RAM 342 is also controlled using an external load control block 522.

The Multi-Tasking Protocol Engine 250 further includes a plurality of registers including SEQCTL, SINDEX, DINDEX, BRKADDR, TILPADDR,EXPLADDR, CONSTANTS, and FUNCTIONONE.

Figure 6A:
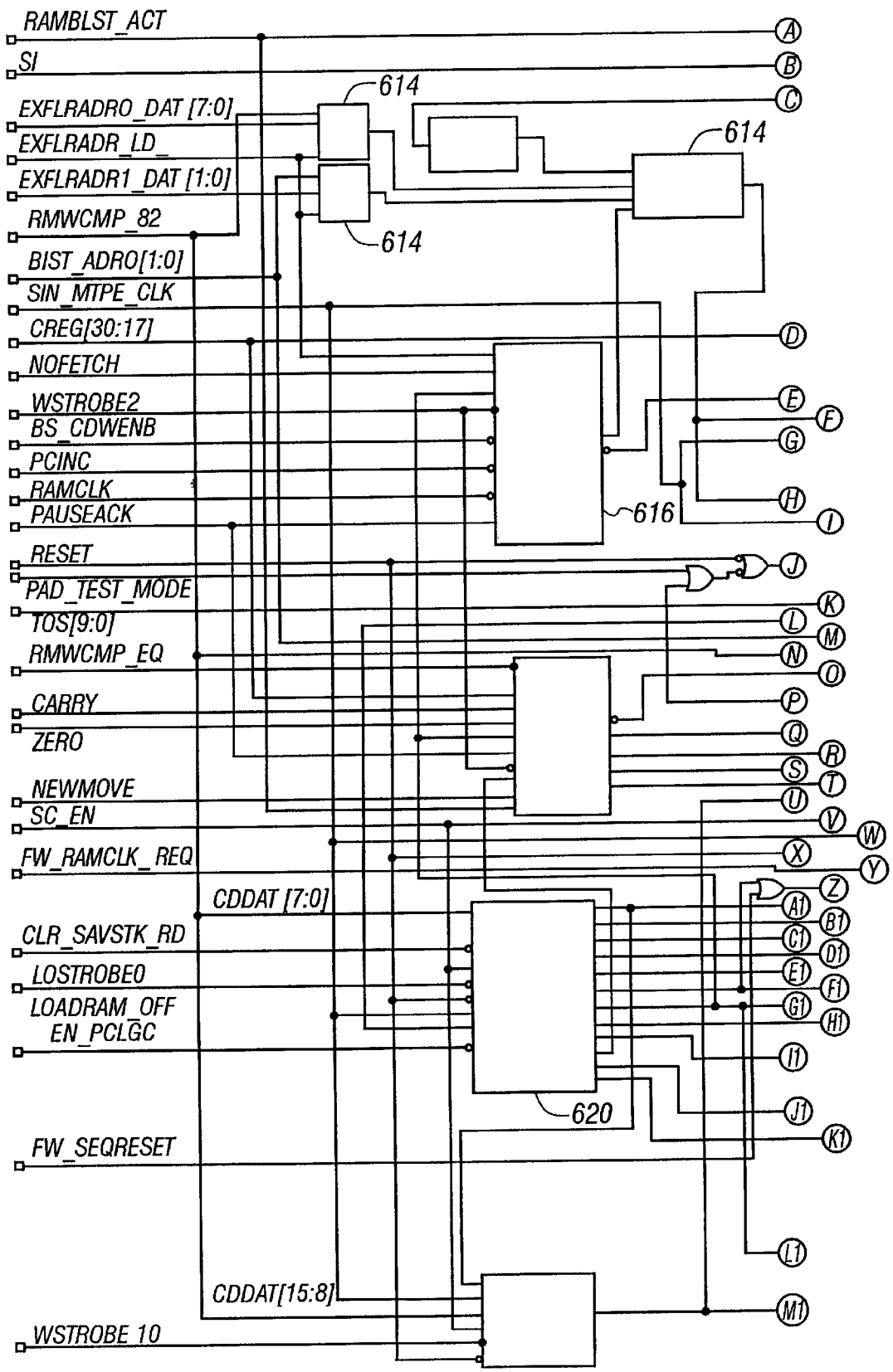
FIGS. 6A, B are schematic mixed block and circuit diagrams that illustrate a program counter that is suitable for usage in the multitasking processor engine sequencer shown in FIGS. 4 and 5.
Figure 6B:
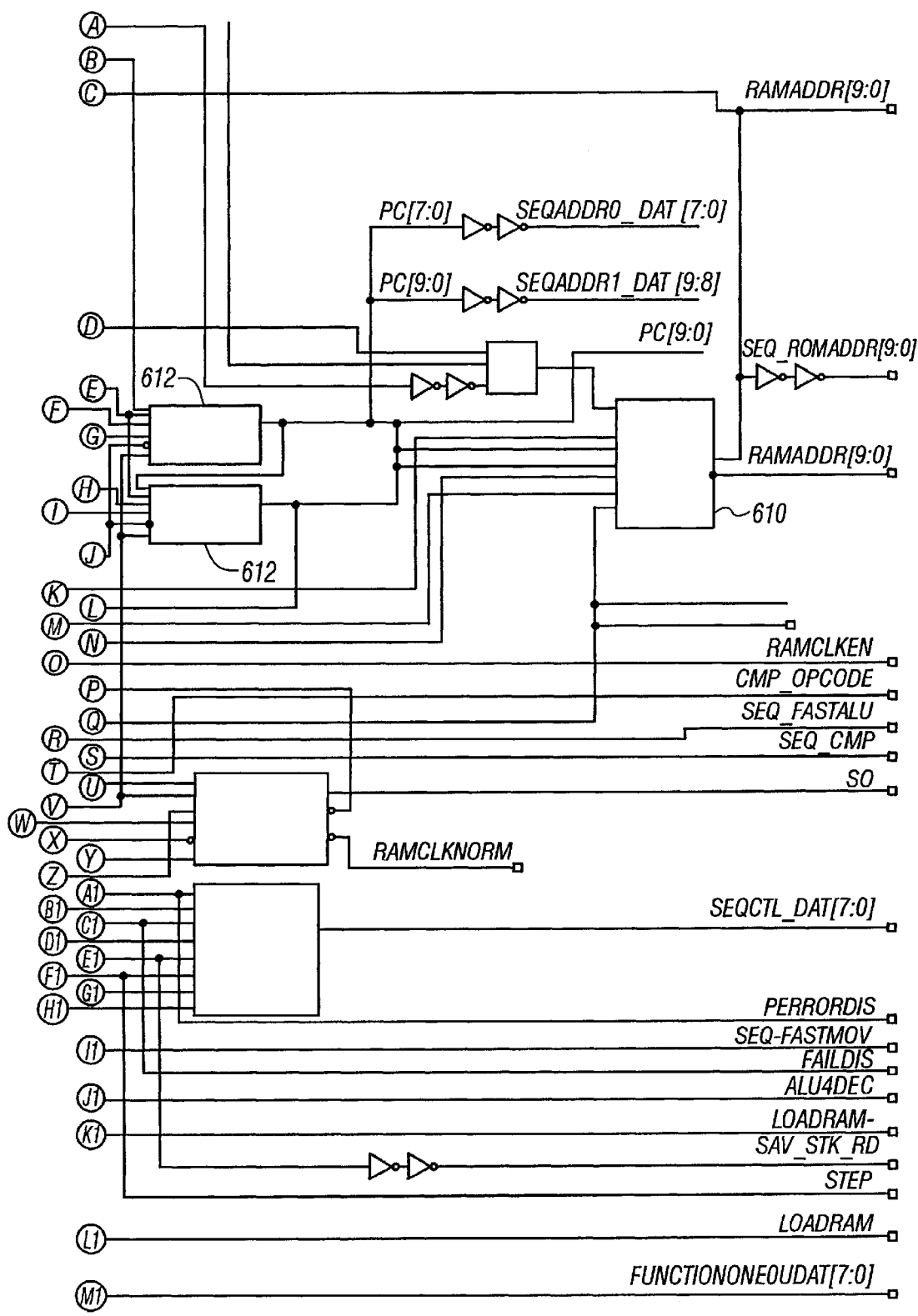

A program counter 430 is shown in more detail in a mixed block and circuit diagram in FIG. 6. The RAM address logic 610 determines the correct sequencer RAM address (RAMADDR[9:0]) to access the control line that is decoded in the next clock cycle by the source and destination address control logic 420. RAM address logic 610 also determines the next value of the program counter PC 430 and manages the top of stack (TOS[9:0]). The sequencer stack 480 is eight words deep. RAM address logic 610 has two distinct modes of operation including a first "normal" mode of operation and a second "pause" mode of operation. A PAUSE bit is deasserted in the normal mode and asserted in the pause mode. In the normal mode, sequencer 250 reads from sequencer memory 342. In the second mode, software sets a bit LOADRAM to enable sequencer memory 342 and write I/O. A pause acknowledge signal PAUSEACK is generated by pause logic 440 in response to any one of the input signals PAUSE, BRKADRINT, ILLOPCODE, ILLSADR, PAUSETOP, SEQPARRAY, RAMPARITYERROR, and STEP.

Operation of the Multi-Tasking Protocol Engine 250 is paused using a HPAUSETOP request from the device driver, an external request, or a CMC CIOBUS DMA request. Operation of the Multi-Tasking Protocol Engine 250 is also paused when the MTPE addresses the address stored in the Top of Idle Loop Address register.

Operation of the Multi-Tasking Protocol Engine 250 is otherwise paused using a HPAUSE request by the device driver in which the Multi-Tasking Protocol Engine 250 is paused at the end of the current instruction. Other pause requests include a diagnostic instruction single-step operation in which operation is paused by an instruction that issues a PAUSE request or HPAUSETOP request, and a hardware address breakpoint in which operation is paused at a selected instruction address.

The program counter 430 includes a 10-bit program counter register 612 that is clocked by a MTPE clock signal. An input address to program counter PC 430 is supplied by multiplexers 614 which are controlled by a signal from the decoder 616 that has input signals PAUSEACK, RAMCLK, PCINC, and a strobe signal WSTROBE. The current address to sequencer memory 342 is incremented by an adder. Alternatively, an address is supplied by CDDAT buses (CDDAT[15:8] and CDDAT[7:0]).

Figure 7A:
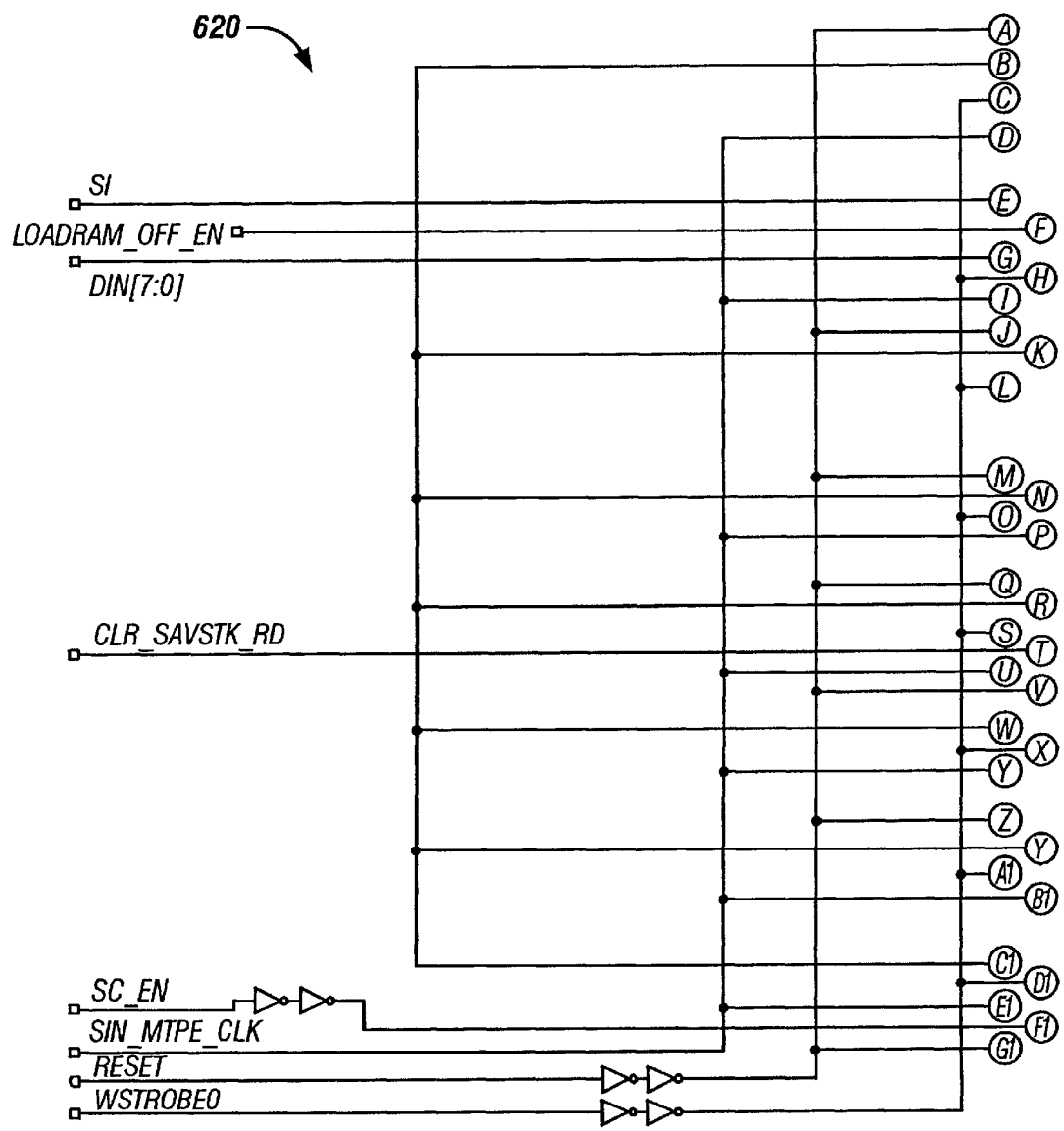
FIGS. 7A, B are schematic circuit diagrams showing a suitable sequencer control (SEQCTL) register for usage in the program counter.
Figure 7B:
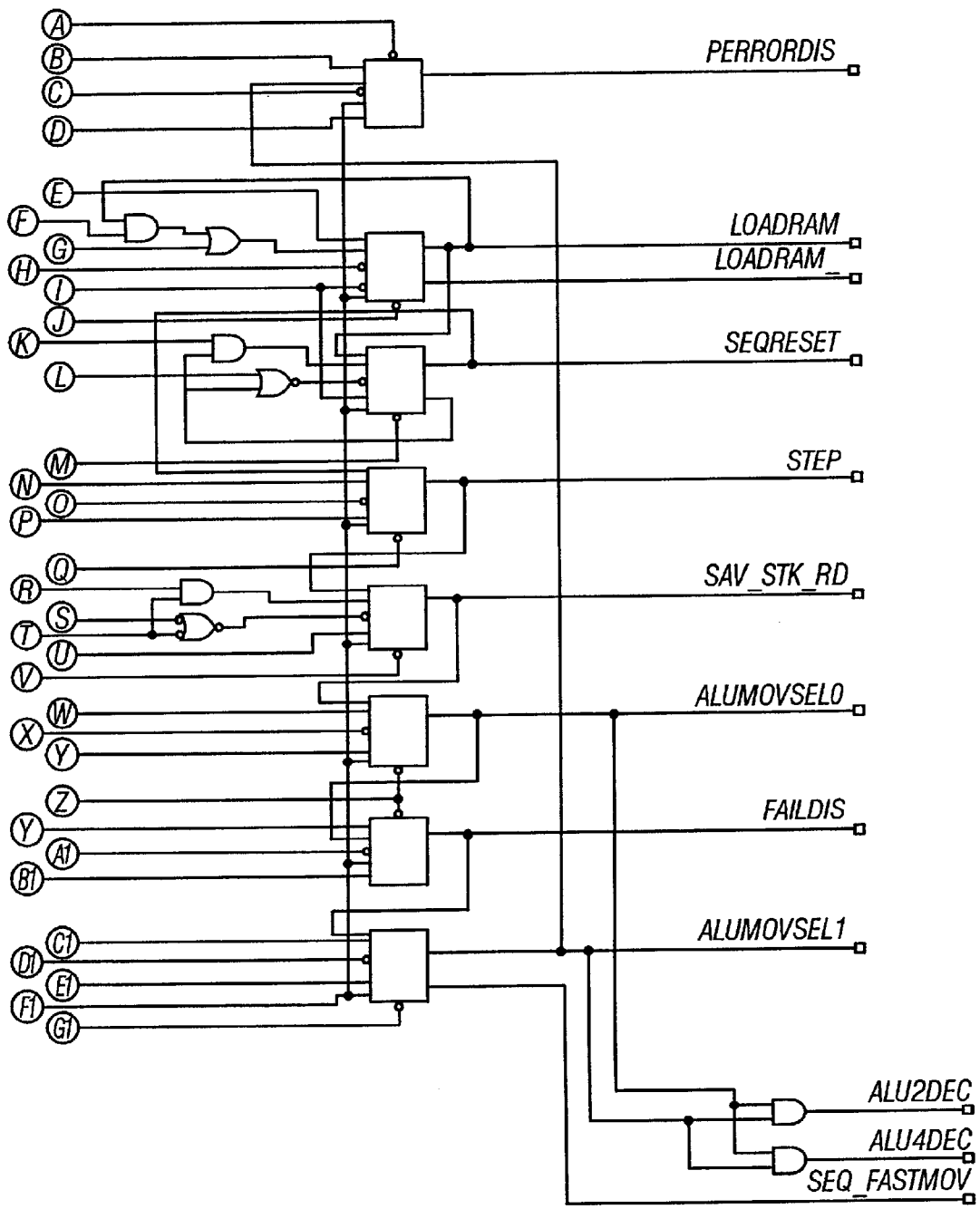

The program counter 430 includes the sequencer control (SEQCTL) register 620 which is shown in more detail in FIG. 7. The sequencer control (SEQCTL) register 620 is a read/write register that selects operating features in the multi-tasking protocol engine 250. Bits of the sequencer control (SEQCTL) register 620 include a parity error disable bit (PERRORDIS) that allows detection of sequencer RAM parity errors when cleared and otherwise disables detection, and ALU MOV select 1 and 0 bits (ALUMOVSEL1:0) select an unstretched MPTE instruction time period. A fail disable (FAILDIS) bit, when set, prevents detection of a sequencer RAM parity error or an illegal Opcode from causing the MTPE to be latch-paused.

A STEP bit, when set, causes the MTPE, unless paused, to execute one instruction, then pause. The device driver normally controls the STEP bit for diagnostic purposes. Multiple single steps are performed by repeatedly writing a 0 to both CMC host control registers PAUSETOP and PAUSE with the STEP bit set. If MTPE sets the STEP bit, the MTPE is paused and the host interface module 118 clears the STEP bit before the MTPE is restarted by writing a 0 value to the HPAUSETOP and HPAUSE bits of the CMC host control register.

A sequencer RAM address reset (SEQRESET) bit, when set, clears the sequencer RAM address (SEQADDR) register and the MTPE instruction at location zero in the sequencer RAM is loaded into a MTPE command line register. The SEQRESET bit is then automatically cleared.

A load RAM (LOADRAM) bit, when set, allows MTPE instruction words to be written into or read from the sequencer RAM by use of I/O accesses through the sequencer RAM data port register.

A save stack read enable (SAVSTKRDEN) bit, when set, permits access to the STACK register as the source of a MOV instruction with a count equal to sixteen bytes. The save stack read enable (SAVSTKRDEN) bit automatically is cleared at the end of the MOV instruction. Data is stored in the destination in a format that enables the data to be restored in the Stack register in the same order as the order prior to the save stack read access. To restore the data in the STACK register, a MOV instruction is executed with save stack read enable (SAVSTKRDEN) bit cleared, the STACK register set as the destination, and the count equal to sixteen bytes.

Figure 8A:
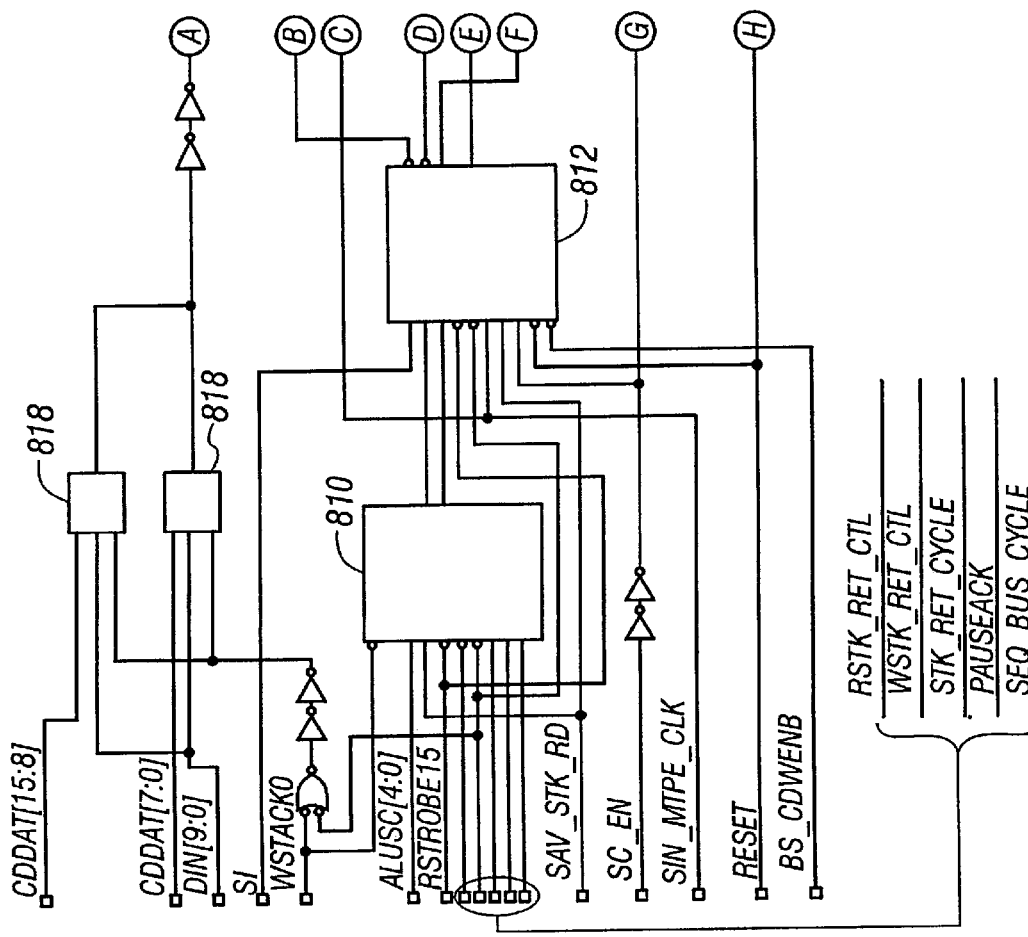
FIGS. 8A, B are schematic block diagrams that illustrate a suitable stack logic for usage in the Multi-Tasking Protocol Engine.
Figure 8B:
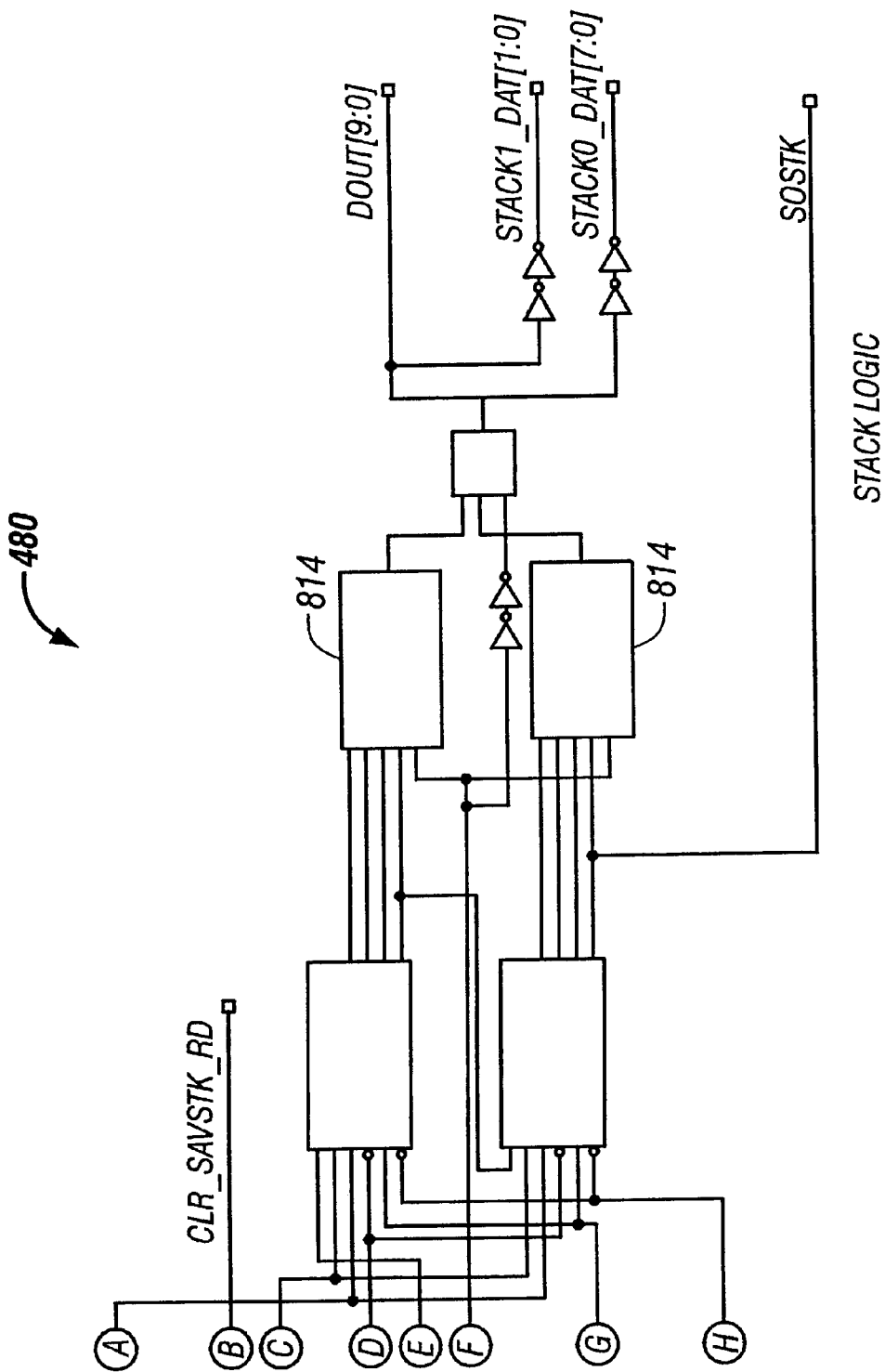
Figure 9:
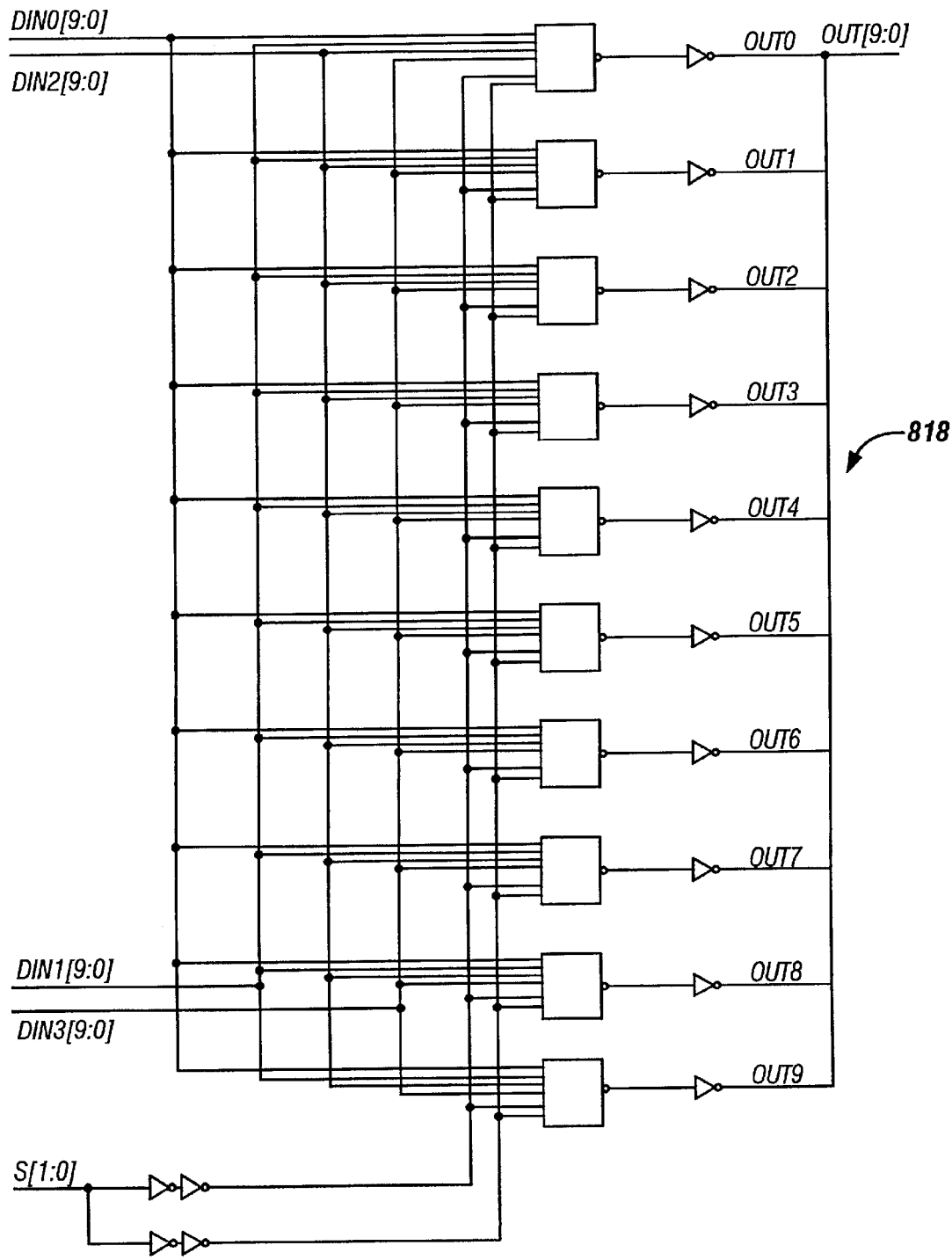
FIG. 9 is a schematic circuit diagram showing a suitable multiplexers for usage in the stack logic.

Referring to FIG. 8, a schematic block diagram illustrates a suitable stack logic 480 for usage in the Multi-Tasking Protocol Engine 250. The stack logic 480 includes multiplexers 818 having input terminals for accessing data lines CDDAT[15:8 ] and CDDAT[7:0] and transferring information on the data lines to stack registers 814. The multiplexers 818 are shown in more detail in FIG. 9.

The stack logic 480 also includes a stack pointer decoder 810 that receives a save stack (SAV_STK_RD) signal, the PAUSEACK signal, signals from the ALU 410 (ALUBC [4:0]), and stack control signals (RSTK_RET_CTL, WSTK_RET_CTL, and STL_RET_CYCLE), and controls whether the stack counts up or counts down. The save stack (SAV_STK_RD) signal enables gating to the stack logic 480 to control whether the stack counts up or counts down. When the savestack bit is in a selected state, a read stack operation causes the stack to update in a specified manner so that when the all entries of the stack have been accessed and the entire stack has been traversed, the bit is returned to an original state.

Figure 10:
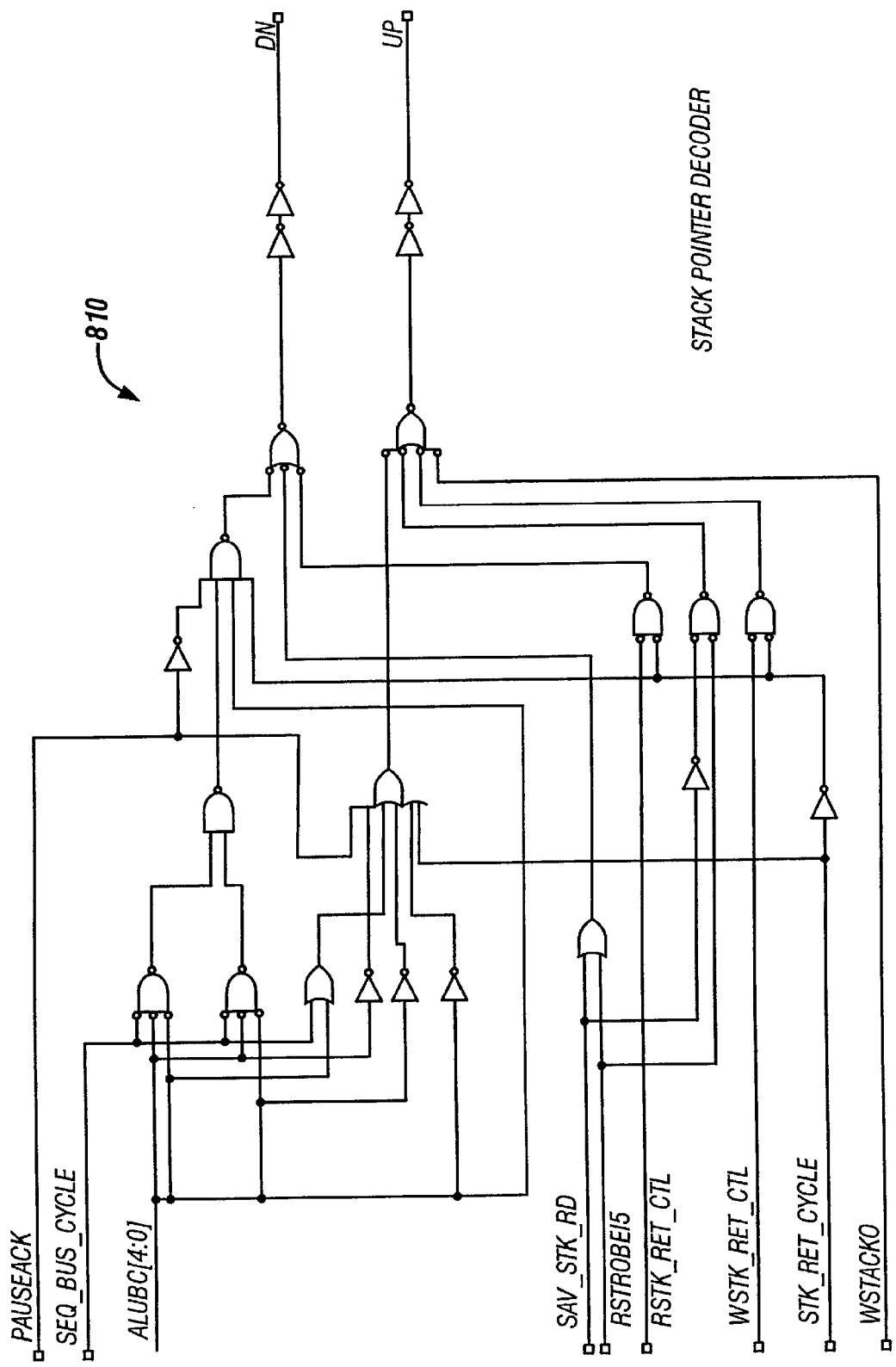
FIG. 10 is a schematic circuit diagram that depicts a stack pointer decoder in the stack logic.
Figure 11A:
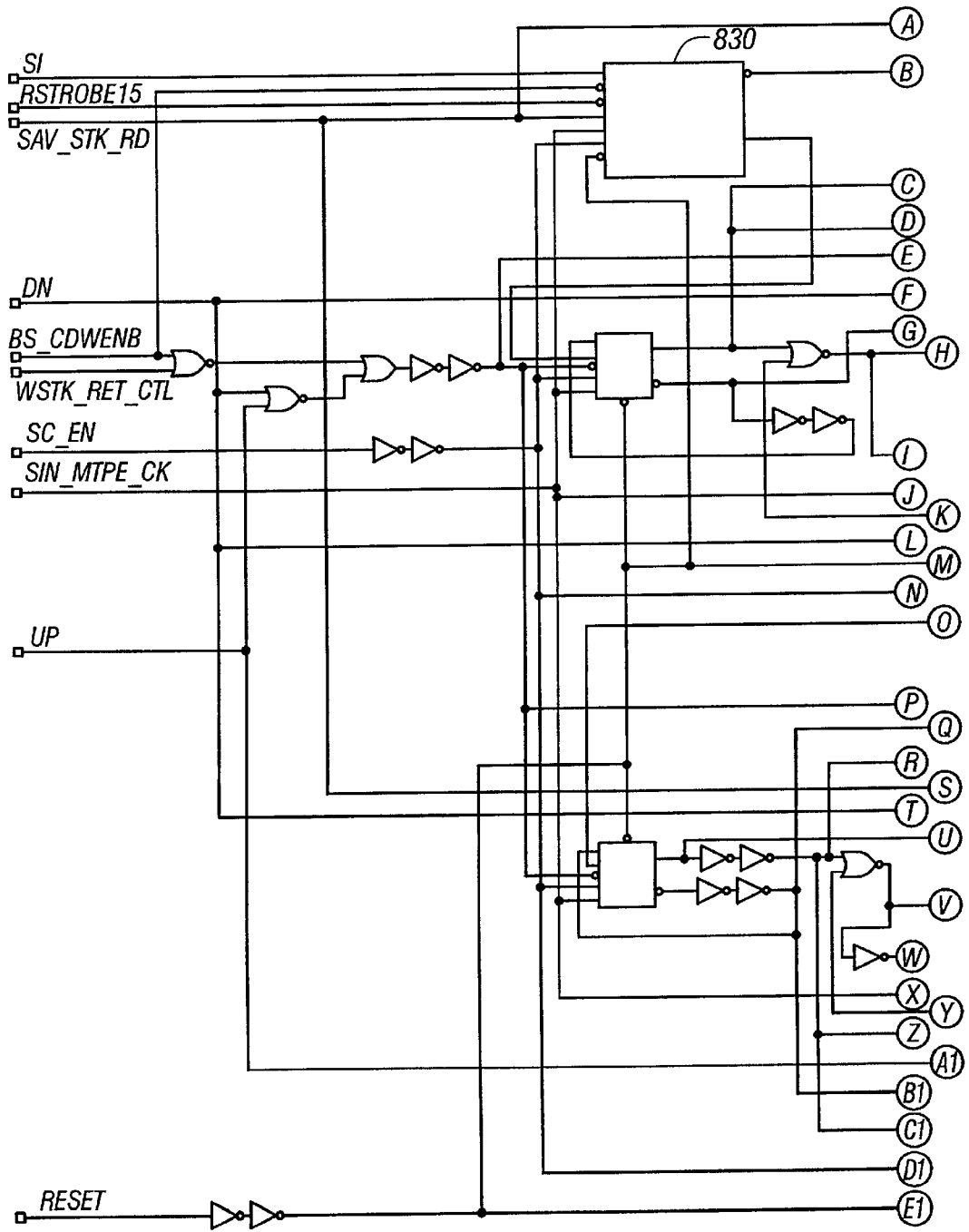
FIGS. 11A, B are schematic circuit diagrams that depicts an up/down counter that is used in the stack pointer decoder and stack logic.
Figure 11B:
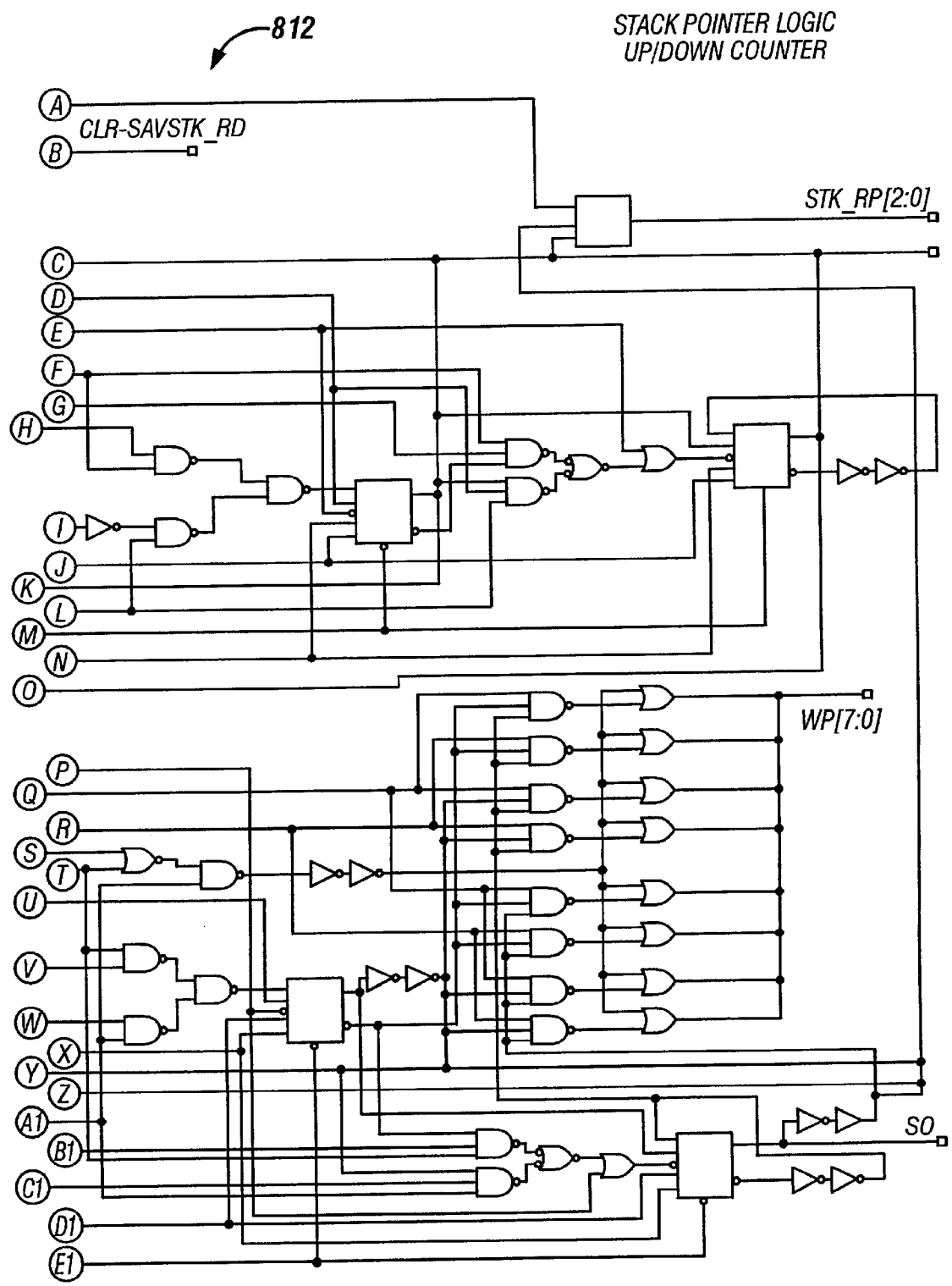

The stack pointer decoder 810 is shown in additional detail in FIG. 10. Referring again to FIG. 8, the stack logic 480 also includes an up/down counter 812 that responds to the stack pointer decoder 810 to increment and decrement the stack. The up/down counter 812, which is shown in detail in a schematic circuit diagram in FIG. 11, controls the stack logic 480 so that the read operation begins at the current stack write address pointer, reading forward causes the stack write pointer to increment, and wraps around in a binary fashion back to the initial address when the MOV instruction completes.

Figure 12:
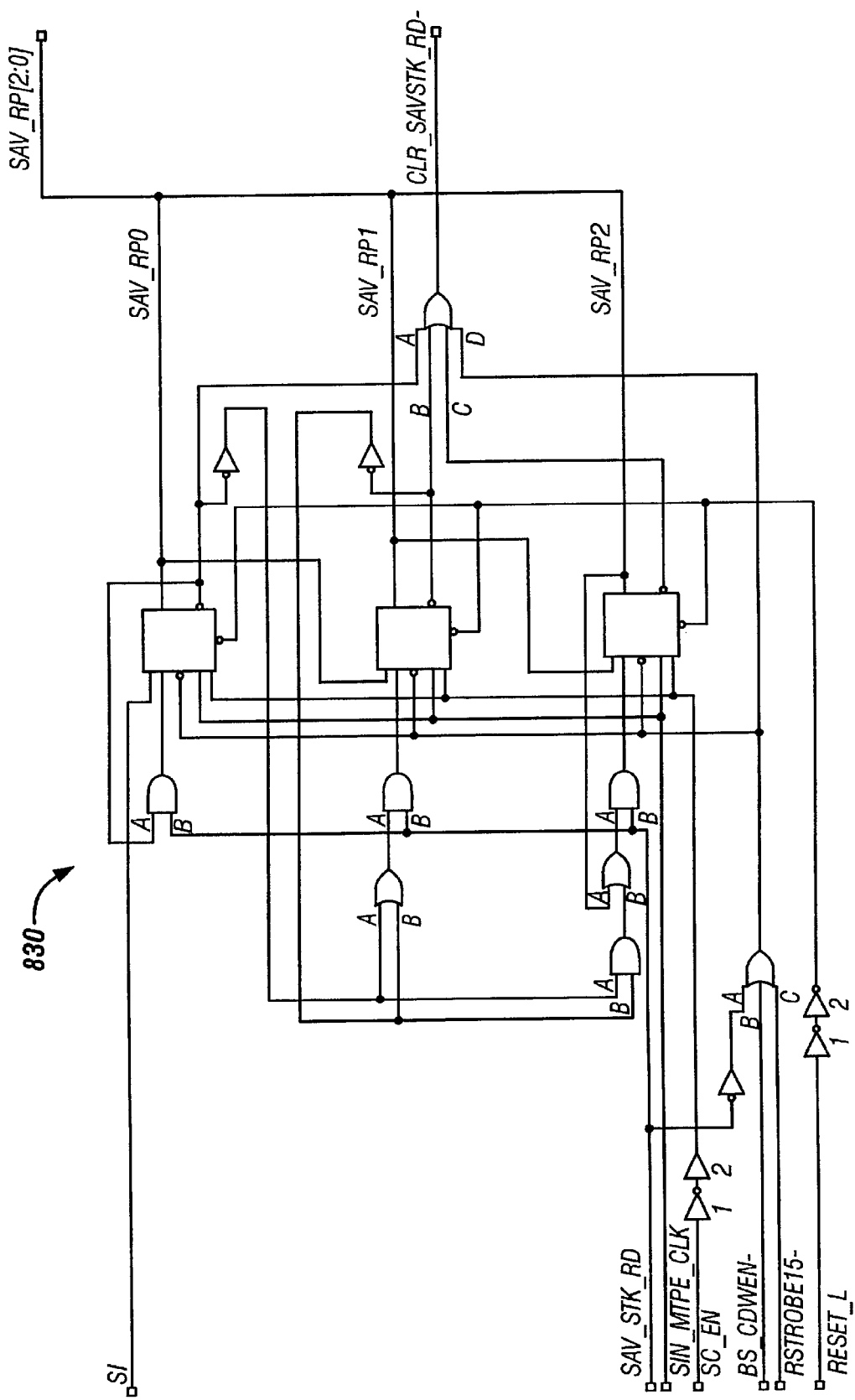
FIG. 12 is a schematic circuit diagram that depicts a save stack control block that is used in the up/down counter, the stack pointer decoder, and stack logic.

The up/down counter 812 includes a save stack control block 830 that controls clearing of the SAVSTKRDEN bit of the SEQCTL register 620. The save stack control block 830 is depicted in more detail in a schematic circuit diagram shown in FIG. 12. In an illustrative embodiment, a SAVSTKRDEN bit of a SEQCTL register is assigned that, when set, enables the save stack read operation to be performed with the MOV instruction of the processor. The SAVSTKRDEN bit is automatically cleared when the MOV count expires so that an additional instruction for clearing the bit is eliminated. In other embodiments, a bit in other registers may be utilized to control a forward read operation. In further additional embodiments, for example when a spare address space is available, one addresses may be assigned that enables the save stack read operation.

Figure 13:
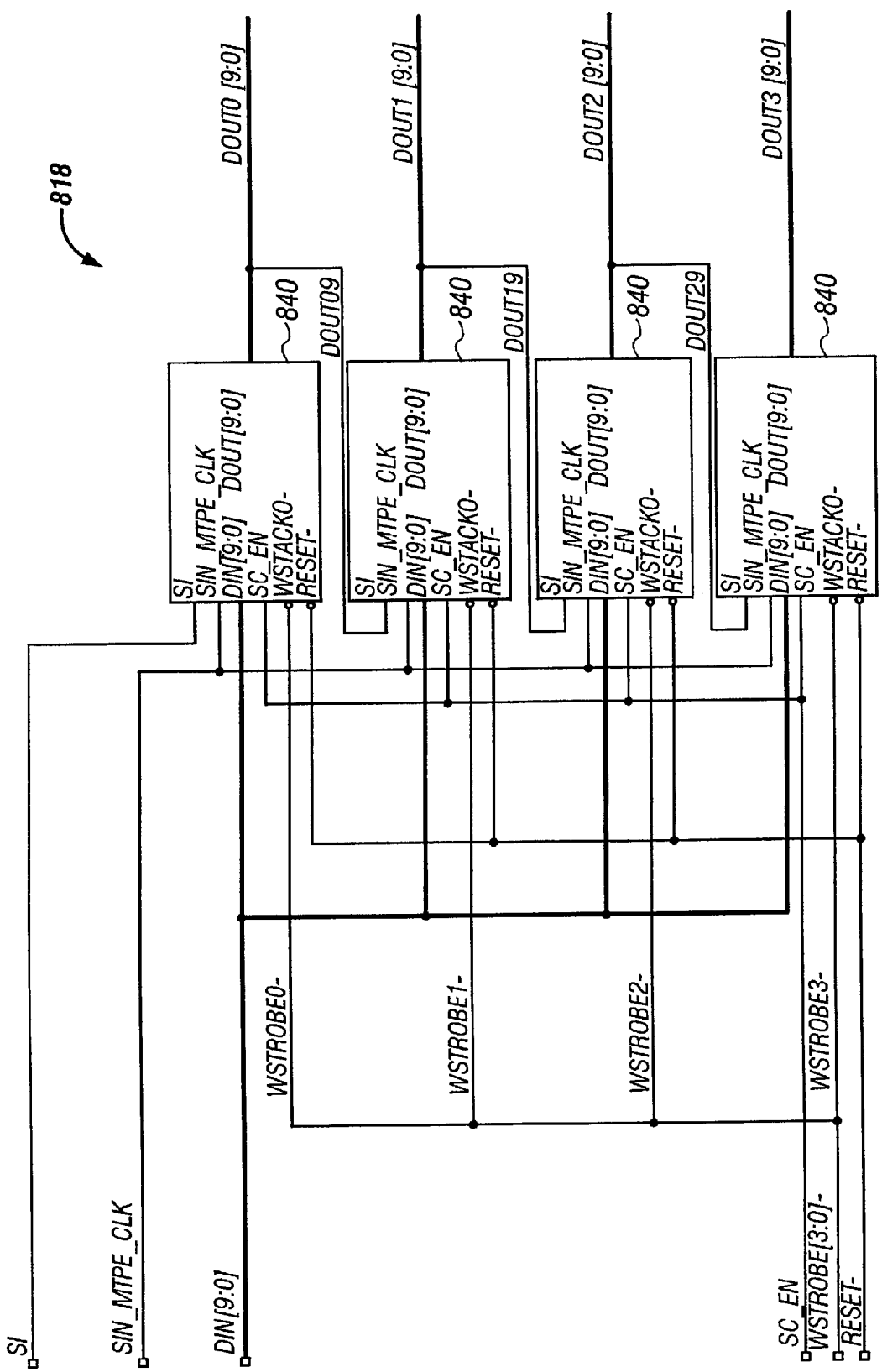
FIG. 13 is a schematic circuit diagram that illustrates stack registers that are suitable for usage in the stack logic in the Multi-Tasking Protocol Engine.
Figure 14:
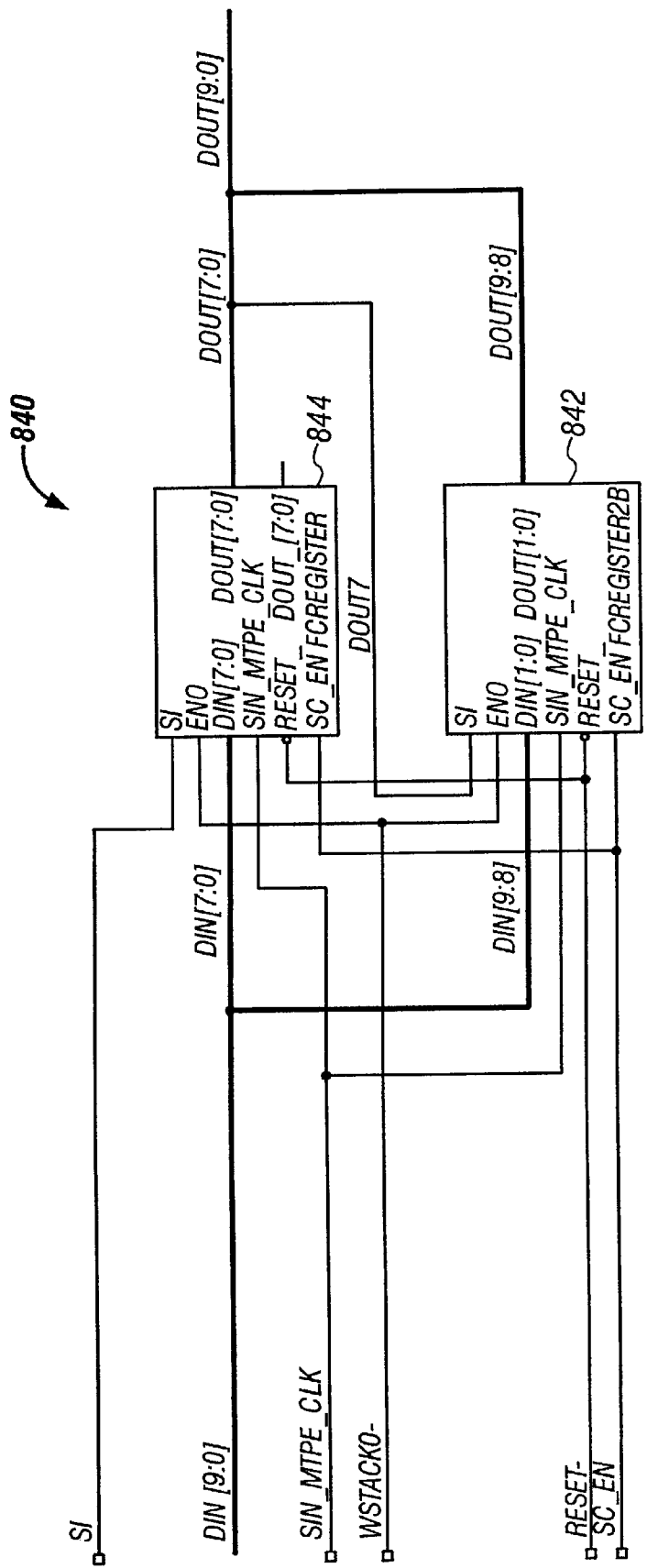
FIGS. 14, 15, and 16 are schematic circuit diagrams that show circuits within the registers.
Figure 15:
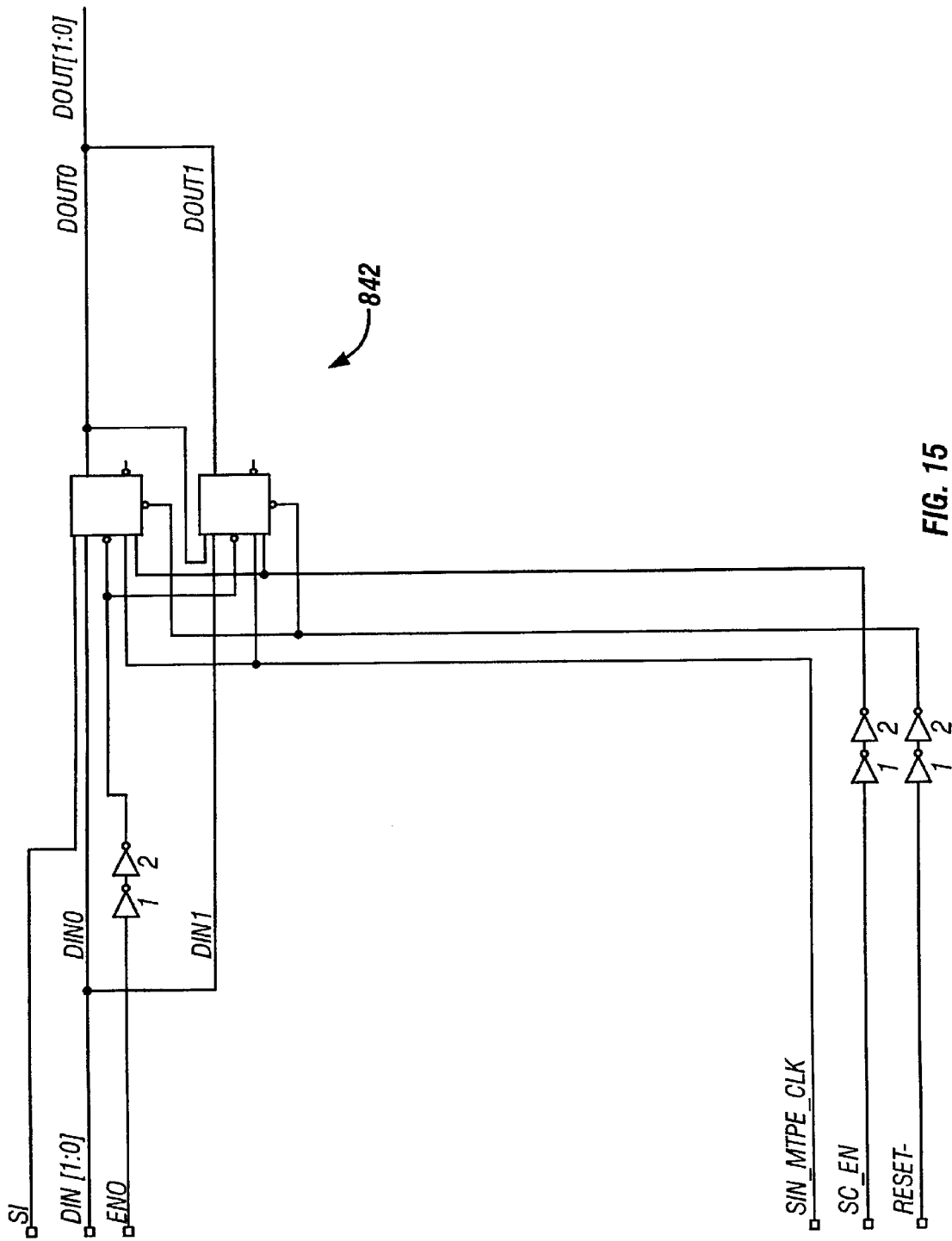
Figure 16:
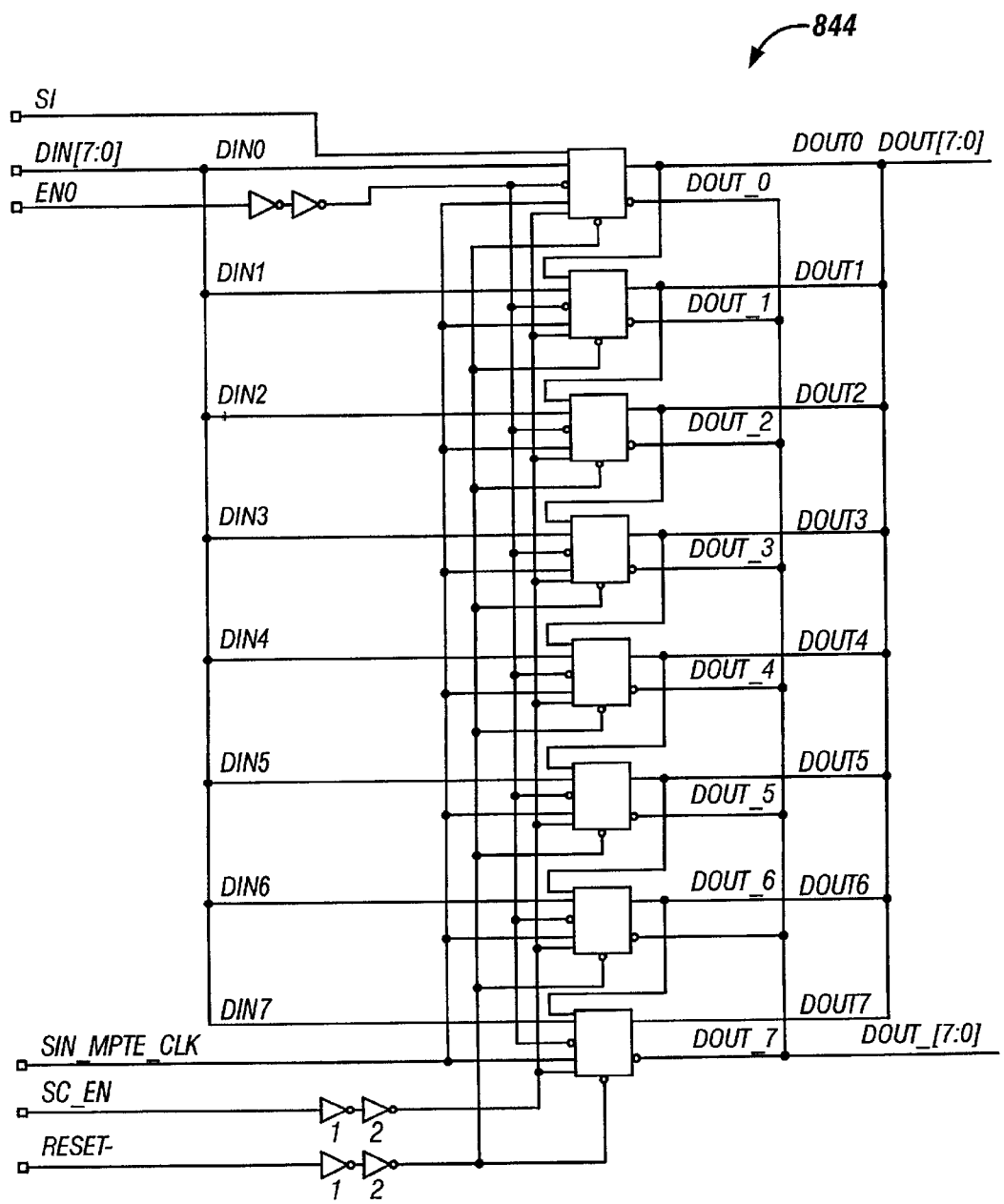

The stack registers 816 shown in FIG. 8 are illustrated in more detail in schematic circuit diagrams in FIG. 13. Individual 10-bit registers 840 are clocked by the MTPE clock signal and selected by strobe lines WSTROBE[3:0]. FIG. 14 shows a schematic circuit diagram of a single 10-bit register 840 that includes a two-bit register 842 and an eight-bit register 844 which are respectively shown in schematic circuits diagrams in FIGS. 15 and 16.

The sequencer 250 executes fifteen instruction types that are categorized into four groups. The general format for command line in Group 1 instructions is shown in FIG. 17A. The general format for the command line in Groups 2 and 3 is shown in FIG. 17B. FIG. 17C shows a format for Group 4 instructions. Group 1 instructions are ALU/Branch Control instructions including OR, AND, XOR, ADD, ADC, and MOV instructions and employ a source address and a destination address. Group 1 support both direct or an indirect mode of addressing for both the source and destination. As a function of the value of a bit in the pipeline register 450, the sequencer 250 executes a return to the address stored on top of stack 480. In the illustrative embodiment, stack 480 supports a maximum of eight pending returns. Group 1 supports execution of special byte manipulation operation, all performed in a single instruction, which moves any source byte to register FUNCTION1 in a first clock cycle and then reads the byte in the next clock cycle. The special byte manipulation performs the function: f1->ONE_OF_EIGHT (source byte bits [6–4]).

Group 2 instructions are primarily used to pass parameters to subroutines on a "call". The destination address is fixed as the value of source index register SINDEX.

Group 3 instructions are used to perform left/right shifts on operand1 to ALU 410. The least significant 8 bits of pipeline register 450 are interpreted to be "shift control bits" and are used only in conjunction with ALU function ROL. The 8 bits specify whether the function is a rotate or a shift and how many positions the bits are moved. A rotate moves all bits to the left with bit 7 moving to bit 0 for each step. All bits are preserved by masking a value of FFh onto operand2 to ALU 410. For shift operations, the appropriate mask is generated for operand2 to zero out certain bits. The basic ALU operations performed in both these cases are a left rotate followed by a logic AND operation. For both rotates and shifts, the carry flag is set to the previous bit 7 or bit 0 value after each step of the move.

Group 4 instructions are used for bit testing. The destination address is none.

The first entry in the "RAM ADDRESS" column for any particular instruction denotes the sequencer RAM address. The second entry denotes the corresponding stack operation for that instruction. Entries for the same instruction are separated by semicolons. An entry surrounded by brackets denotes the contents of that location. For example, (PC), denotes the contents of the program counter. "TOS" stands for the Top of Stack, "PC" stands for Program Counter and "NCTS" stands for No Change To Stack. "NEXT_ADDRESS" includes pipeline register 450, destination, and RT fields.

The entry in the PROGRAM COUNTER column for any particular instruction indicates the value of the program counter for the next clock cycle.

| GROUPS 1 AND 4 INSTRUCTIONS | RETURN BIT | RAM ADDRESS | PROGRAM COUNTER |
| --- | --- | --- | --- |
| OR | 0 | (PC); NCTS | (PC) + 1 |
|  | 1 | (PC); (TOS); TOS = TOS–1 | (TOS)+1 |
| AND | 0 | (PC); NCTS | (PC) + 1 |
|  | 1 | (PC); (TOS); TOS = TOS–1 | (TOS)+1 |
| XOR | 0 | (PC); NCTS | (PC) + 1 |
|  | 1 | (PC); (TOS); TOS = TOS–1 | (TOS)+1 |
| ADD | 0 | (PC); NCTS | (PC) + 1 |
|  | 1 | (PC); (TOS); TOS = TOS–1 | (TOS)+1 |
| ADC | 0 | (PC); NCTS | (PC) + 1 |
|  | 1 | (PC); (TOS); TOS = TOS–1 | (TOS)+1 |
| ROL | 0 | (PC); NCTS | (PC) + 1 |
|  | 1 | (PC); (TOS); TOS = TOS–1 | (TOS)+1 |
| MOV_BLK | 0 | (PC); NCTS | (PC) + 1 (imm=0) |
|  | 1 | (PC); (TOS) (imm=0) TOS=TOS–1 | (TOS)+1 (imm=0) |

In the group 1 and group 4 instructions, the sequencer RAM address is accessed from the program counter whether the return bit is set to zero or one. However, if the return bit is equal to 0, then the stack is not changed by the instruction. If the return bit is equal to 1, the stack is popped at the end of the instruction to obtain the address of the next instruction. For the group 1 and group 4 instructions, the program counter is set to the contents of the program counter incremented by 1 if the return bit is 0. If the return bit is 1, the program counter is the information at the top of the stack incremented by 1.

| GROUP 2 INSTRUCTIONS | CARRY FLAG | RAM ADDRESS | PROGRAM COUNTER |
|---|---|---|---|
| ORI jmp | X | (next-addr);NCTS | (next-addr) + 1 |
| ORI jc | 0 | (PC); NCTS | (PC) + 1 |
|  | 1 | (next-addr); NCTS | (next-addr) + 1 |
| ORI jnc | 0 | (next-addr); NCTS | (next-addr) + 1 |
|  | 1 | (PC); NCTS | (PC) + 1; |
| ORI call | X | (next-addr) (TOS) = (PC) TOS = TOS + 1 | (next-addr) + 1 |

| GROUP 3 INSTRUCTIONS | ZERO BIT | RAM ADDRESS | PROGRAM COUNTER |
|---|---|---|---|
| XOR jz | 0 | (next-addr);NCTS | (next-addr) + 1 |
|  | 1 | (PC); NCTS | (PC) + 1 |
| AND jz | 0 | (next-addr);NCTS | (next-addr) + 1 |
|  | 1 | (PC); NCTS | (PC) + 1 |
| XOR jnz | 0 | (PC); NCTS | (PC) + 1 |
|  | 1 | (next-addr);NCTS | (next-addr) + 1 |
| AND jnz | 0 | (PC); NCTS | (PC) + 1 |
|  | 1 | (next-addr);NCTS | (next-addr) + 1 |

Figure 18:
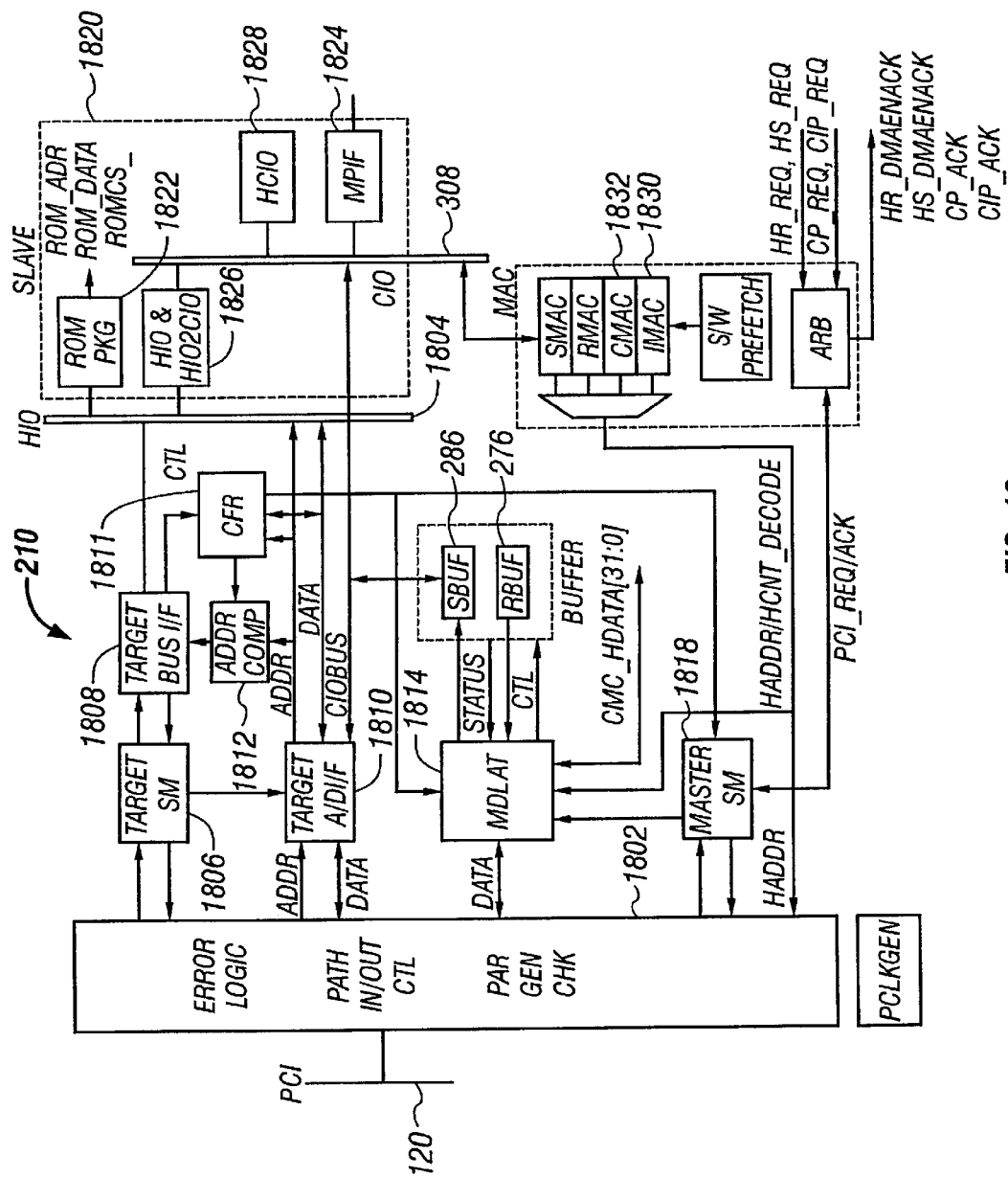
FIG. 18 is a schematic block diagram that illustrates part of the internal architecture of a host interface.

Referring to FIG. 18, a schematic block diagram illustrates a portion of an internal architecture of the host interface 210. The host interface 210 supports PCI bus programmable Latency Timer, Cache Size, and Interrupt Line Select registers. The host interface 210 also supports PCI bus address and data parity generation and checking. The host interface 210 also contains I/O registers used by the host adapter driver 114 during the normal operation of host adapter 140 including general control registers and interrupt status and control registers.

The host interface 210 has a PCI interface 1802 forming a direct pin-out connection to a 64-bit or 32-bit PCI bus 120. The PCI interface 1802 includes a path input module, a path output module, and a miscellaneous module. The path input module includes address and command byte enable input latches, parity checking, and input data steering. The path output module includes address, data, and command byte enable multiplexers for all output signals, and parity generation. The miscellaneous module includes pad control decoding, dual interrupt enable and error control, and error logic.

The host interface 210 includes the bus target interface 216 that connects the CIOBUS 308 and HIOBUS 1804 within the host adapter 140 to the PCI interface 1802. The bus target interface 216 includes a target state machine 1806, a target bus interface module 1808, a target address data interface 1810, a configuration module 1811, and an address comparator 1812. The target state machine 1806 handles PCI target mode and protocol operations including transmit ready, device select, and stop generation. The target state machine 1806 also generates target data phase signals. The target bus interface module 1808 defines a target transfer protocol such as the HIOBUS interface protocol. The target bus interface module 1808 also generates configuration read write strobes to the configuration module 1811, performs address decodes, and performs command decodes. The target address data interface 1810 reflects address and data flow. The configuration module 1811 includes configuration registers, performs specific configuration register decode operations, and performs IO, memory, and ROM base compare operations. The configuration module 1811 also sets latency timeout durations. The configuration registers are readable from register space of devices in the host adapter 140. Device configuration registers, such as DEVCONFIG, are included in the host interface 210 to configure data for PCI interface 210 including a device base address and an interrupt request IRQ.

The host interface 210 also includes the bus master interface 214 that connects the send payload buffer 286 and the receive payload buffer 276 to the PCI interface 1802. A latch 1814 is connected between the PCI interface 1802 and includes two-level latches, byte alignment multiplexers and a packer for transferring data between the PCI bus 120 and the send payload buffer 286, and between the receive payload buffer 276 and the PCI interface 1802. The latch 1814 allows non-aligned reads from the system memory to transfer a stream of bytes stored in the payload buffer 286. The latch 1814 also allows writing of a stream of bytes from the receive payload buffer 276 to the PCI bus 120. The latch 1814 generates read and write strobes to the send payload buffer 286 and the receive payload buffer 276 and decodes status information including counts, and cache line size availability for starting or terminating PCI master cycles.

A master state machine module 1818 handles PCI master mode and protocol operations including PREQ generation and PCI arbitration. The master state machine module 1818 also generates frame, device selection timeout, and command signals. The master state machine module 1818 controls device selection timeouts, latency timeout activation, dual address cycles, park conditions, and master data and address phase signals.

The bus master interface 214 supports zero wait state 64-bit memory data transfers at 267 Mbytes/sec data bursts including leading and trailing 64-bit boundary offset bytes, with a 64-bit address range.

A slave 1820 includes a ROM data packer module 1822, a memory port interface module 1824, a host 10 module 1826, and a host CIOBUS IO module 1828. The ROM data packer module 1822 routes ROM addresses and control signals to the memory port interface 230. ROM 148 reads pack incoming 8-bit ROM data from the memory port interface 230 into 32-bit groups prior to sending the data to the PCI bus 120. The memory port interface module 1824 handles byte and word writes to the memory port interface 230 via the CIOBUS 308. The host 10 module 1826 contains host-only accessible registers including a one-byte parity error status register and a one-byte parity error enable register. The host IO module 1826 translates CIOBUS signals based on HIOBUS activity. The host CIOBUS IO module 1828 contains CIOBUS accessible registers including a host to RPB 276 DMA control register, a host to SPB 286 DMA control register, an RPB 276 status register, an SPB 286 status register, a mode select register, and a testmode register.

Host interface 210 interrupt handling addresses PCI errors and Internal Parity Errors. Errors on the PCI bus 120 generate interrupts to the system if enabled. PCI bus errors are reflected in the PCI configuration space register STA- TUS1 (04h) including error bits DPE, SSE, RMA, RTA, STA, and DPR. The host adapter 140 handles multiple different DMA operations so that the errors are further classified into specific types and logged accordingly in DMA_ERROR[2:0] registers. The DMA_ERROR[2:0] registers are located in PCI configuration space (48h, 49h, and 4Ah). Five groups of DMA errors are partitioned based on the DMA operation in which the error occurs including HR-DMA, HS_DMA, CP_DMA, CIP_DMA, or CC_DMA. DMA errors are classified only into groups DPE, RMA, RTA and DPR, so that only these classes are further classified into specific DMA operations. In addition, a status bit T_DPE is set in the event of a PCI target DPE error directed to the host adapter 140.

Error notifications are generated as follows: First, respective PERRESPEN and SERREPSEN bits are set active. CMC interrupt status enable bits are also set including CIP_DMAEN=1, INTEN=1, and IPEN[1] bit 7 PCI_ERR_INTEN=1.

When the PCI errors occur, for instance, DPE error on HR_DMA, the HR_DMA_DPE bit of DMA_ERROR[0] bit 7 is set; the HR_ERROR bit of the HR_STATUS register is also set for the Multi-Tasking Protocol Engine 250; as well as the DPE bit of the PCI configuration register STATUS1 bit 31. The host interface 210 then sets the CMC PCI_ERR_INT bit in POST_STAT[1] register bit 7. Interrupts are enabled so that the POST_STAT is posted and IRQ is issued.

Servicing by the hardware interface module 118 proceeds as follows. The hardware interface module 118 detects that POST_STAT[1] value is set appropriately and evaluates the PCI config STATUS1 register. The DPE bit is set so that the hardware interface module 118 continues to determine which DMA is implied via the DMA_ERROR register. When the interrupt is serviced, the hardware interface module 118 then clears the DPE and HR_DMA_DPE bit by writing (1) to the bits. Clearing the respective DMA_ERROR bit also clears the HR_ERROR bit of the HR_STATUS register. The POST_STAT[1] bit 7 PCI_ERR_INT bit clears the HR_ERROR bit of the HR_STATUS register. The POST_STAT [1] bit 7 PCI_ERR_INT bit is cleared by writing to the CLR_PCI_INT bit of the CLRINT[1] register, thereby clearing the IRQ.

Internal Parity Errors are other internal HST errors including parity errors between data paths of HST/CMC/RPB. The data path from command management channel 220 to host interface 210 may have an internal parity error. In this event, the CMC CRPARERR status bit in ERROR register is set; the HW_ERR_INT bit of POST_STAT[1] register bit 6 is also set. If interrupts are enabled, IRQ is asserted. The hardware interface module 118 detects an internal hardware error and evaluates the ERROR register to determine the source. Servicing is completed after all evaluations and the CRPARERR bit is cleared via the CLR_PARERR bit of the CLRINT1 register bit 6, also clearing the HW_ERR_INT POST_STAT[1] bit 6. Another source of parity error is the data path from receive payload buffer 276 to host interface 210 which sets the CMC DRHPARERR bit. Clearing of the interrupt is performed similarly.

Registers in the configuration module 1811 include a device configuration register, DEVCONFIG. The Device Configuration register is a read/write register that supports mode selection control of features in the host adapter 140. DEVCONFIG may be read or written at any time in Configuration space. However, changing values in DEVCONFIG is performed with care due to the functional changes controlled. For example, the DEVCONFIG value is reset to 80h only during RST# assertion. Bits 4, 5, and 7 of DEVCONFIG are not used and always read zero.

Bit 6 of DEVCONFIG is MRDCEN, a Memory Read Command Enable bit. An active (1) MRDEN enables the PCI master command-out generator to generate the MRDC command value for PCI defined conditions. When inactive, MRDEN causes the PCI master command-out generator to convert all MRDC commands for defined conditions to MRDLC commands regardless of condition are always used as defined by the PCI. MRDC command is the only command affected by MRDEN regardless of the state of MRDEN, MRDLC or MRDMC commands.

Bit 3 of DEVCONFIG is BERREN, a Byte Parity Error Enable bit. When BERREN is active (1), the internal byte parity generators create even-parity for the associated data byte. When BERREN is inactive, normal odd-parity is generated. BERREN is used to test the parity checking logic in the data paths (HST-SPB-SFC; RFC-RPB-HST; HST-MPI; HST-CMC-MPI).

Bit 2 of DEVCONFIG is DACEN, a Dual Address Cycle Enable bit. When DACEN is active, the host adapter 140 is enabled to issue Dual Address Cycle (DAC) master transactions of 32-bit range within a 32-bit page of a 64-bit range pointed to by the non-zero value stored in the Hx_DMA_HADR[3:0] registers. When Hx_DMA_HADR[3:0] stored value is zero, only Single Address Cycles (SAC) is issued the same as when DACEN is not active.

Bit 1 of DEVCONFIG is CIP_RD_DIS, a CMC Interrupt Posting Read DMA Disabled bit. When CIP_RD_DIS is active (1), the CIP DMA operation is performed as a single 4-byte PCI write to system memory operation with no readback DMA for comparison to verify delivery. When CIP_RD_DIS is inactive (0), a single 4-byte PCI write to system memory is followed by a PCI 4-byte read to flush out the system bridges and the POST_STAT static is compared to ensure the latest status update.

Bit 0 of DEVCONFIG is EXTM_BISTEN, an External Memory BIST Enable bit. When EXTM_BISTEN is active (1), the BIST logic performs Built-In-Self-Test (BIST) testing to the external SRAM.

Programs are developed for the Multi-Tasking Protocol Engine 250 using an assembler. A series of instructions are defined and implemented in a macro include file which compile to a linkable object module. The resulting object module can be directly loaded into sequencer firmware memory 342.

The following is a definition of a portion of the instruction set for generating sequencer programs for a host adapter 140 integrated circuit. Instructions are compiled to multi-byte opcodes, which are loaded into a control register of Multi-Tasking Protocol Engine 250. All instructions compile to one opcode, unless otherwise indicated.

Definitions—
   A=accumulator
   ret=return
   [ ]=optional
   /=alternative
   Z=zero flag
   CY=carry flag Move—
   mov_blk destination, source, count [ret]
      Move source to destination by the count (range 1–127 bytes, offset by X1 or X2).

Return (optional).
Flags affected: Z
mov destination,source,bytecount [ret]
Move multiple bytes (bytecount) source to destination.
Return (optional).
Flags affected: Z
mvi destination,immediate [ret]
Move immediate to destination.
Return (optional).
Flags affected: Z
Logical—
not destination[,source] [ret]
Move source to destination (optional).
Move one's complement of destination to destination.
Return (optional).
Flags affected: Z
and destination,immediate/A[,source] [ret]
Move source to destination (optional).
Move logical AND of destination and immediate/accumulator to destination.
Return (optional).
Flags affected: Z
or destination,immediate/A[,source] [ret]
Move source to destination (optional).
Move logical OR of destination and immediate/accumulator to destination.
Return (optional).
Flags affected: Z
x or destination,immediate/A[,source] [ret]
Move source to destination (optional).
Move logical Exclusive OR of destination and immediate/accumulator to destination.
Return (optional).
Flags affected: Z
nop
No operation performed.
No destinations altered.
Flags affected: Z
Arithmetic—
add destination,immediate/A [,source] [ret]
Move source to destination (optional).
Move arithmetic ADD without carry of destination and immediate/accumulator to destination.
If immediate=0:
Moves destination prior to ADD to accumulator.
Compiles to two instructions;

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

For example, the processor that implements the stack 480 is described as the Multi-Tasking Protocol Engine 250. In other embodiments, other various types of processors including microprocessors, computers, microcomputers, microcontrollers, controllers, digital signal processors, and the like may utilize an embodiment of the stack. Usage of a microprocessor is illustrative only of a general processing unit in a computer system and is not intended to limit the invention. Furthermore, throughout the claims the term "a" is used to introduce an element but does not in any instance refer to a single or "one" element but instead refers to "one or more than one" element.

What is claimed is:

1. A processor comprising:

a memory space;

a stack including a plurality of stack storage elements, the stack being addressable to the processor as a single point address location in the memory space;

one or more functional units coupled to the stack, the functional units capable of executing stack manipulation instructions including a multiple element move instruction for reading and writing the plurality of stack storage elements; and a stack save region of the memory space that is accessed for storing or retrieving the plurality of stack storage elements in a single multiple element move instruction.

2. A processor comprising:

a memory space;

a circular stack including a plurality of stack storage elements, the stack being addressable to the processor as a single point address location in the memory space;

one or more functional units coupled to the stack, the functional units capable of executing stack manipulation instructions including a multiple element move instruction for reading and writing the stack storage elements; and a stack save region of the memory space that is accessed for storing or retrieving the plurality of stack storage elements in a single multiple element move instruction.

3. A processor comprising:

a memory space;

a stack including a plurality of stack storage elements, the stack being addressable to the processor as a single point address location in the memory space;

one or more functional units coupled to the stack, the functional units capable of executing stack manipulation instructions including a multiple element move instruction for reading and writing the stack storage elements, a call instruction that pushes the stack, and a return instruction that pops the stack; and a stack save region of the memory space that is accessed for storing or retrieving the plurality of stack storage elements in a single multiple element move instruction.

4. A processor comprising:

a memory space;

a stack including a plurality of stack storage elements, the stack being addressable to the processor as a single point address location in the memory space;

one or more functional units coupled to the stack, the functional units capable of executing stack manipulation instructions including a multiple element move instruction for reading and writing the stack storage elements, wherein the multiple element move instruction has a start source address argument designating a first source address of multiple elements to be transferred, a start destination address argument designating a first destination address to receive the multiple elements, and a count argument designating a number of elements to be transferred; and a stack save region of the memory space that is accessed for storing or retrieving the plurality of stack storage elements in a single multiple element move instruction.

5. A processor comprising:

a memory space;

a stack including a plurality of stack storage elements, the stack being addressable to the processor as a single point address location in the memory space;

one or more functional units coupled to the stack, the functional units capable of executing stack manipulation instructions including a multiple element move instruction for reading and writing the stack storage elements and a move instruction that selectively transfers stack elements individually or in a multiple-element block in a single instruction; and a stack save region of the memory space that is accessed for storing or retrieving the plurality of stack storage elements in a single multiple element move instruction.

6. A processor comprising:

a memory space;

a stack including a plurality of stack storage elements, the stack being addressable to the processor as a single point address location in the memory space;

one or more functional units coupled to the stack, the functional units capable of executing stack manipulation instructions including a multiple element move instruction for reading and writing the stack storage elements that transfers stack elements in an order selected between a forward order and a reverse order; and a stack save region of the memory space that is accessed for storing or retrieving the plurality of stack storage elements in a single multiple element move instruction.

7. A processor according to claim 6 wherein:

the one or more functional units execute a multiple element move instruction for reading and writing the stack storage elements that transfers stack elements in an order selected between a forward order and a reverse order using a selection bit of a control register.

8. A processor according to claim 7 wherein:

the one or more functional units execute a multiple element move instruction for reading and writing the stack storage elements that transfers stack elements in an order selected between a forward order and a reverse order using a selection bit of a control register, the one or more functional units resetting the selection bit following a multiple-element move instruction.

9. A processor according to claim 6 wherein:

the one or more functional units execute a multiple element move instruction for reading and writing the stack storage elements that transfers stack elements in an order selected between a forward order and a reverse order using a selector contained in an address space.

10. A processor comprising:

a memory space;

a stack including a plurality of stack storage elements, the stack being addressable to the processor as a single point address location in the memory space, wherein processor is a reduced-instruction set computer (RISC) processor;

one or more functional units coupled to the stack, the functional units capable of executing stack manipulation instructions including a multiple element move instruction for reading and writing the stack storage elements; and a stack save region of the memory space that is accessed for storing or retrieving the plurality of stack storage elements in a single multiple element move instruction.

11. A stack in a processor including a memory space, the stack comprising:

a plurality of stack storage elements;

a beginning stack storage element that is addressable to the processor as a single point address location in the memory space;

a functional unit coupled to the plurality of stack storage elements and capable of executing a multiple element move instruction including an instruction for reading and writing the plurality of stack storage elements; and a stack save region of the memory space that is accessed for storing or retrieving the plurality of stack storage elements in a single multiple element move instruction.

12. A stack in a processor including a memory space, the stack comprising:

a plurality of stack storage elements;

a beginning stack storage element that is addressable to the processor as a single point address location in the memory space;

a functional unit coupled to the plurality of stack storage elements and capable of executing a multiple element move instruction, wherein the multiple element move instruction transfers stack elements in an order selected between a forward order and a reverse order; and a stack save region of the memory space that is accessed for storing or retrieving the plurality of stack storage elements in a single multiple element move instruction.

13. A stack according to claim 12 wherein:

the multiple element move instruction transfers stack elements in an order selected between a forward order and a reverse order using a selection bit of a control register.

14. A stack according to claim 13 wherein:

the multiple element move instruction transfers stack elements in an order selected between a forward order and a reverse order using a selection bit of a control register, the functional unit resetting the selection bit following a multiple-element move instruction.

15. A stack according to claim 12 wherein:

the multiple element move instruction transfers stack elements in an order selected between a forward order and a reverse order using a selector contained in an address space.

16. A stack in a processor including a memory space, the stack comprising:

a circular stack;

a plurality of stack storage elements;

a beginning stack storage element that is addressable to the processor as a single point address location in the memory space;

a functional unit coupled to the plurality of stack storage elements and capable of executing a multiple element move instruction; and a stack save region of the memory space that is accessed for storing or retrieving the plurality of stack storage elements in a single multiple element move instruction.

17. A stack in a processor including a memory space, the stack comprising:

a plurality of stack storage elements;

a beginning stack storage element that is addressable to the processor as a single point address location in the memory space;

a functional unit coupled to the plurality of stack storage elements and capable of executing stack manipulation instructions including a call instruction that pushes the stack and a return instruction that pops the stack; and a stack save region of the memory space that is accessed for storing or retrieving the plurality of stack storage elements in a single multiple element move instruction.

18. A stack in a processor including a memory space, the stack comprising:

a plurality of stack storage elements;

a beginning stack storage element that is addressable to the processor as a single point address location in the memory space;

a functional unit coupled to the plurality of stack storage elements and capable of executing a multiple element move instruction, wherein the multiple element move instruction has a start source address argument designating a first source address of multiple elements to be transferred, a start destination address argument designating a first destination address to receive the multiple elements, and a count argument designating a number of elements to be transferred; and a stack save region of the memory space that is accessed for storing or retrieving the plurality of stack storage elements in a single multiple element move instruction.

19. A network interface comprising:

a communication channel data path that is connectable to a communication channel;

a host interface coupled to the communication channel data path that is connectable bus for further coupling to a host system; and a processor coupled to the communication channel data path, the processor for controlling high-speed data transfer on the communication channel data path, the processor including:

a memory space;

a stack including a plurality of stack storage elements, the stack being addressable to the processor as a single point address location in the memory space;

one or more functional units coupled to the stack, the functional units capable of executing stack manipulation instructions including a multiple element move instruction for reading and writing the stack storage elements; and a stack save region of the memory space that is accessed for storing or retrieving the plurality of stack storage elements in a single multiple element move instruction.

20. A network interface according to claim 19 wherein:

the communication channel data path is a fiber channel data path that is connectable to a fiber channel link.

21. A network interface according to claim 19 wherein:

the host interface is a PCI host interface for connecting to a host system by a Peripheral Component Interconnect (PCI) bus.

22. A network interface according to claim 19 wherein:

the processor is a reduced-instruction set computer (RISC) processor.

23. A network interface according to claim 19 wherein:

the stack is a circular stack.

24. A network interface according to claim 19 wherein, the stack manipulation instructions include a call instruction that pushes the stack and a return instruction that pops the stack.

25. A network interface according to claim 19 wherein:

the multiple element move instruction of the stack manipulation instructions has a start source address argument designating a first source address of multiple elements to be transferred, a start destination address argument designating a first destination address to receive the multiple elements, and a count argument designating a number of elements to be transfected.

26. A network interface according to claim 19 wherein:

the stack manipulation instructions include a move instruction that selectively transfers stack elements individually or in a multiple-element block in a single instruction.

27. A network interface according to claim 19 wherein:

the one or more functional units execute a multiple element move instruction for reading and writing the stack storage elements that transfers stack elements in an order selected between a forward order and a reverse order.

28. A network interface according to claim 19 wherein:

the one or more functional units execute a multiple element move instruction for reading and writing the stack storage elements that transfers stack elements in an order selected between a forward order and a reverse order using a selection bit of a control register.

29. A network interface according to claim 19 wherein:

the one or more functional units execute a multiple element move instruction for reading and writing the stack storage elements that transfers stack elements in an order selected between a forward order and a reverse order using a selection bit of a control register, the one or more functional units resetting the selection bit following a multiple-element move instruction.

30. A network interface according to claim 19 wherein:

the one or more functional units execute a multiple element move instruction for reading and writing the stack-storage elements that transfers stack elements in an order selected between a forward order and a reverse order using a selector contained in an address space.

31. A method of controlling a stack in a processor including a memory space, the method comprising:

addressing as a source address a beginning stack storage element of a plurality of stack storage elements in the processor as a single point address location in the memory space;

addressing as a destination address a beginning stack save region of the memory space;

supplying a stack element count;

executing a multiple element move instruction stack manipulation instruction for storing or retrieving the plurality of stack storage elements in a single multiple-element move instruction.

32. A method according to claim 31 further comprising:

transferring stack elements in an order selected between a forward order and a reverse order.

33. A method according to claim 31 further comprising:

transferring stack elements in an order selected between a forward order and a reverse order using a selection bit of a control register.

34. A method according to claim 31 further comprising:.

transferring stack elements in an order selected between a forward order and a reverse order using a selection bit of a control register;

resetting the selection bit following a multiple-element move instruction.

35. A method according to claim 31 further comprising:

transferring stack elements in an order selected between a forward order and a reverse order using a selection bit of a control register using a selector contained in an address space.

36. A method according to claim 31 wherein:

the stack is a circular stack.

\* \* \* \* \*